US012694574B2

(12) United States Patent
Akhtar et al.

(10) Patent No.: US 12,694,574 B2
(45) Date of Patent: Jul. 28, 2026

(54) ATTRIBUTE CODING AND UPSCALING FOR POINT CLOUD COMPRESSION

(71) Applicant: QUALCOMM Incorporated, San Diego, CA (US)

(72) Inventors: Anique Akhtar, San Diego, CA (US); Geert Van der Auwera, San Diego, CA (US); Adarsh Krishnan Ramasubramonian, Irvine, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 163 days.

(21) Appl. No.: 18/632,140

(22) Filed: Apr. 10, 2024

(65) Prior Publication Data

US 2024/0346707 A1 Oct. 17, 2024

Related U.S. Application Data

(60) Provisional application No. 63/495,833, filed on Apr. 13, 2023.

(51) Int. Cl.
| | |
|---|---|
| *G06T 9/00* | (2006.01) |
| *G06T 9/40* | (2006.01) |
| *G06T 17/00* | (2006.01) |

(52) U.S. Cl.
CPC ............... *G06T 9/002* (2013.01); *G06T 9/40* (2013.01); *G06T 17/00* (2013.01); *G06T 2210/32* (2013.01); *G06T 2210/56* (2013.01)

(58) Field of Classification Search
CPC G06T 9/002; G06T 9/40; G06T 17/00; G06T 2210/32; G06T 2210/56
See application file for complete search history.

(56) References Cited

U.S. PATENT DOCUMENTS 12,450,690 B2 * 10/2025 Liu ....................... G06T 3/4053
12,462,417 B2 * 11/2025 Rukhovich .......... G06V 10/771
(Continued)

OTHER PUBLICATIONS

W. Liu et al. 3D Point Cloud Reconstruction Based on Deformed Network [Online]. Nov. 2021, Journal of Network Intelligence, vol. 6 [Retrieved on Nov. 10, 2025]. Retrieved from the Internet: < https://bit.nkust.edu.tw/~jni/2021/vol6/s4/13.JNI0254.pdf> (Year: 2021).*

(Continued)

*Primary Examiner* — King Y Poon
*Assistant Examiner* — David Van Nguyen
(74) *Attorney, Agent, or Firm* — QUALCOMM Incorporated; Espartaco Diaz Hidalgo

(57) ABSTRACT

An example device for decoding point cloud data includes: a memory configured to store point cloud data; and one or more processors implemented in circuitry and configured to: decode encoded point cloud geometry data for a point cloud to form reconstructed point cloud geometry data for the point cloud; downscale the point cloud geometry data to form downscaled point cloud geometry data; decode attribute data for the point cloud using the downscaled point cloud geometry; apply the attribute data to the reconstructed point cloud geometry data to form intermediate point cloud data; and apply a residual learning network to the intermediate point cloud data to form a reconstructed point cloud.

20 Claims, 21 Drawing Sheets

(56)　　　　　References Cited

U.S. PATENT DOCUMENTS

| | | | |
|---|---|---|---|
| 2019/0087979 A1* | 3/2019 | Mammou | H04N 19/597 |
| 2021/0211734 A1* | 7/2021 | Ray | H04N 19/70 |
| 2021/0350583 A1* | 11/2021 | Lasserre | G06T 17/10 |
| 2023/0052330 A1* | 2/2023 | Kim | H04N 19/156 |
| 2023/0075442 A1 | 3/2023 | Ma et al. | |
| 2024/0331206 A1* | 10/2024 | Oh | H04N 19/119 |

OTHER PUBLICATIONS

3DG: "G-PCC Codec Description v6", Coding of Moving Pictures and Audio, ISO/IEC JTC1/SC29/WG11, N19091, Jan. 2020, Brussels, BE, Mar. 27, 2020, 92 pages.

Akhtar A., et al., "[AI-3DGC] Dynamic Point Cloud Geometry Compression using Sparse Convolutions", International Organisation for Standardisation Organisation Internationale De Normalisation ISO/IEC JTC 1/SC 29/WG 7 Coding of Moving Pictures and Audio, ISO/IEC JTC 1/SC 29/WG 7m 59617, Online—Apr. 2022, 7 Pages.

Akhtar A., et al., "[AI-3DGC][EE5.3-related] Baseline Attribute Compression for ML Based PCC", 140. Mpeg Meeting; Oct. 24, 2022-Oct. 28, 2022, Mainz, (Motion Picture Expert Group or ISO/IEC JTC1/SC29/WG11), m61313, Mainz, Oct. 23, 2022, 23 Pages.

Akhtar A., et al., "[AI-3DGC][EE5.3-related] Update on Baseline Attribute Compression for ML-Based PCC", 141. MPEG Meeting, Jan. 16, 2023-Jan. 20, 2023, Online, (Motion Picture Expert Group or, ISO/IEC JTC1/SC29/WG11), No. m62180, Jan. 18, 2023, 14 Pages.

Github: "MPEGGroup/mpeg-pcc-tmc13", Accessed on Oct. 21, 2022, pp. 1-3.

Github: "MPEGGroup/mpeg-pcc-tmc2", Accessed on Oct. 21, 2022, pp. 1-8.

Graziosi D., et al., "An Overview of Ongoing Point Cloud Compression Standardization Activities: Video-Based (V-PCC) and Geometry-Based(G-PCC)", APSIPA Transactions on Signal and Information Processing, Industrial Technology Advances, SIP, vol. 9, No. e13, Apr. 2020, pp. 1-17.

He K., et al., "Deep Residual Learning for Image Recognition", IEEE Conference on Computer Vision and Pattern Recognition (CVPR), 2016, pp. 770-778.

"Information technology—Coded Representation of Immersive Media—Part 5: Visual Volumetric Video-based Coding (V3C) and Video-based Point Cloud Compression (V-PCC)", V-PCC Future Enhancements (V3C + V-PCC), 130. MPEG Meeting, Apr. 20, 2020-Apr. 24, 2020, Alpbach, (Motion Picture Expert Group or ISO/IEC JTC1/SC29/WG11), No. n19329, May 9, 2020, pp. 246.

Information Technology—MPEG-I (Coded Representation of Immersive Media)—Part 9: Geometry-based Point Cloud Compression, ISO/IEC 23090-9:2020(E), ISO/IEC JTC 1/SC 29/WG 11, Jan. 13, 2020-Jan. 17, 2020, Brussels, (Motion Picture Expert Group or ISO/IEC JTC1/SC29/WG11), No. n19088 , Apr. 20, 2020, XP030287968, 127 pages.

International Search Report and Written Opinion—PCT/US2024/024119—ISA/EPO—Jul. 15, 2024.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

Schwarz S., et al., "Emerging MPEG Standards for Point Cloud Compression", IEEE Journal on Emerging and Selected Topics in Circuits and Systems, vol. 9, No. 1, Mar. 2019, pp. 133-148.

Targ S., et al., "Resnet in Resnet: Generalizing Residual Architectures", Workshop track—ICLR, arXiv:1603.08029v1 [cs.LG] Mar. 25, 2016, pp. 1-7.

Tourapis A.M. (Apple Inc.), et al., "PCC TMC2: Video Resolution", 123. MPEG Meeting, Jul. 16, 2018-Jul. 20, 2018, Ljubljana; (Motion Picture Expert Group or ISO/IEC JTC1/SC29/WG11), No. m43685, Jul. 11, 2018, 9 Pages.

WG 7, MPEG 3D Graphics Coding: "G-PCC codec description", International Organization for Standardization Organisation Internationale De Normalisation ISO/IEC JTC 1/SC 29/WG 7 MPEG 3D Graphics Coding, ISO/IEC JTC 1/SC 29/WG 7, N00271, Jan. 2022, 151 Pages.

Wu Z., et al., "Wider or Deeper: Revisiting the ResNet Model for Visual Recognition", arXiv:1611.10080v1, Nov. 30, 2016, 19 Pages.

* cited by examiner (b) Residual Block (a) Residual Layer

ENCODE GEOMETRY
INFORMATION
1500

DECODE GEOMETRY
INFORMATION
1502

DOWNSCALE GEOMETRY
INFORMATION
1504

RECOLOR DOWNSCALED
GEOMETRY USING
ATTRIBUTE INFORMATION
1506

ENCODE DOWNSCALED
ATTRIBUTE INFORMATION
1508

FIG. 19

ATTRIBUTE CODING AND UPSCALING FOR POINT CLOUD COMPRESSION

This application claims the benefit of U.S. Provisional Application No. 63/495,833, filed Apr. 13, 2023, the entire contents of which are hereby incorporated by reference.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

In general, this disclosure describes techniques for point cloud coding (e.g., encoding or decoding), including geometry and attribute data coding of point cloud data. In particular, geometry information (e.g., point coordinates within the point cloud) may be efficiently encoded using a deep learning-based encoder. The attribute data for the points (e.g., color, reflectance, brightness, surface normals, or the like) generally includes a larger amount of data than the geometry data. Therefore, the point cloud encoder may reconstruct the geometry data, then downscale the geometry data and also downscale the attribute data prior to encoding the attribute data. A point cloud decoder may then decode and reconstruct the full-scale geometry data, downscale the geometry data, and decode the attribute data using the downscaled geometry data. Per techniques of this disclosure, the decoder may apply a residual learning network to the decoded attribute data to upsample the attribute data to the original, full scale. In this manner, the techniques of this disclosure may achieve a significant savings of bits when transporting encoded attribute data, while highly accurately reconstructing the full scale point cloud.

In one example, a device for decoding point cloud data includes: a memory configured to store point cloud data; and one or more processors implemented in circuitry and configured to: decode encoded point cloud geometry data for a point cloud to form reconstructed point cloud geometry data for the point cloud; downscale the point cloud geometry data to form downscaled point cloud geometry data; decode attribute data for the point cloud using the downscaled point cloud geometry; apply the attribute data to the reconstructed point cloud geometry data to form intermediate point cloud data; and apply a residual learning network to the intermediate point cloud data to form a reconstructed point cloud.

In another example, a method of decoding point cloud data includes: decoding encoded point cloud geometry data for a point cloud to form reconstructed point cloud geometry data for the point cloud; downscaling the point cloud geometry data to form downscaled point cloud geometry data; decoding attribute data for the point cloud using the downscaled point cloud geometry; applying the attribute data to the reconstructed point cloud geometry data to form intermediate point cloud data; and applying a residual learning network to the intermediate point cloud data to form a reconstructed point cloud.

In another example, a computer-readable storage medium has stored thereon instructions that, when executed, cause a processor to: decode encoded point cloud geometry data for a point cloud to form reconstructed point cloud geometry data for the point cloud; downscale the point cloud geometry data to form downscaled point cloud geometry data; decode attribute data for the point cloud using the downscaled point cloud geometry; apply the attribute data to the reconstructed point cloud geometry data to form intermediate point cloud data; and apply a residual learning network to the intermediate point cloud data to form a reconstructed point cloud.

In another example, a device for decoding point cloud data includes: means for decoding encoded point cloud geometry data for a point cloud to form reconstructed point cloud geometry data for the point cloud; means for downscaling the point cloud geometry data to form downscaled point cloud geometry data; means for decoding attribute data for the point cloud using the downscaled point cloud geometry; means for applying the attribute data to the reconstructed point cloud geometry data to form intermediate point cloud data; and means for applying a residual learning network to the intermediate point cloud data to form a reconstructed point cloud.

The details of one or more examples are set forth in the accompanying drawings and the description below. Other features, objects, and advantages will be apparent from the description, drawings, and claims.

BRIEF DESCRIPTION OF DRAWINGS

FIG. 19 is a conceptual diagram illustrating an example vehicle-based scenario in which one or more techniques of this disclosure may be used.

DETAILED DESCRIPTION

Figure 1:
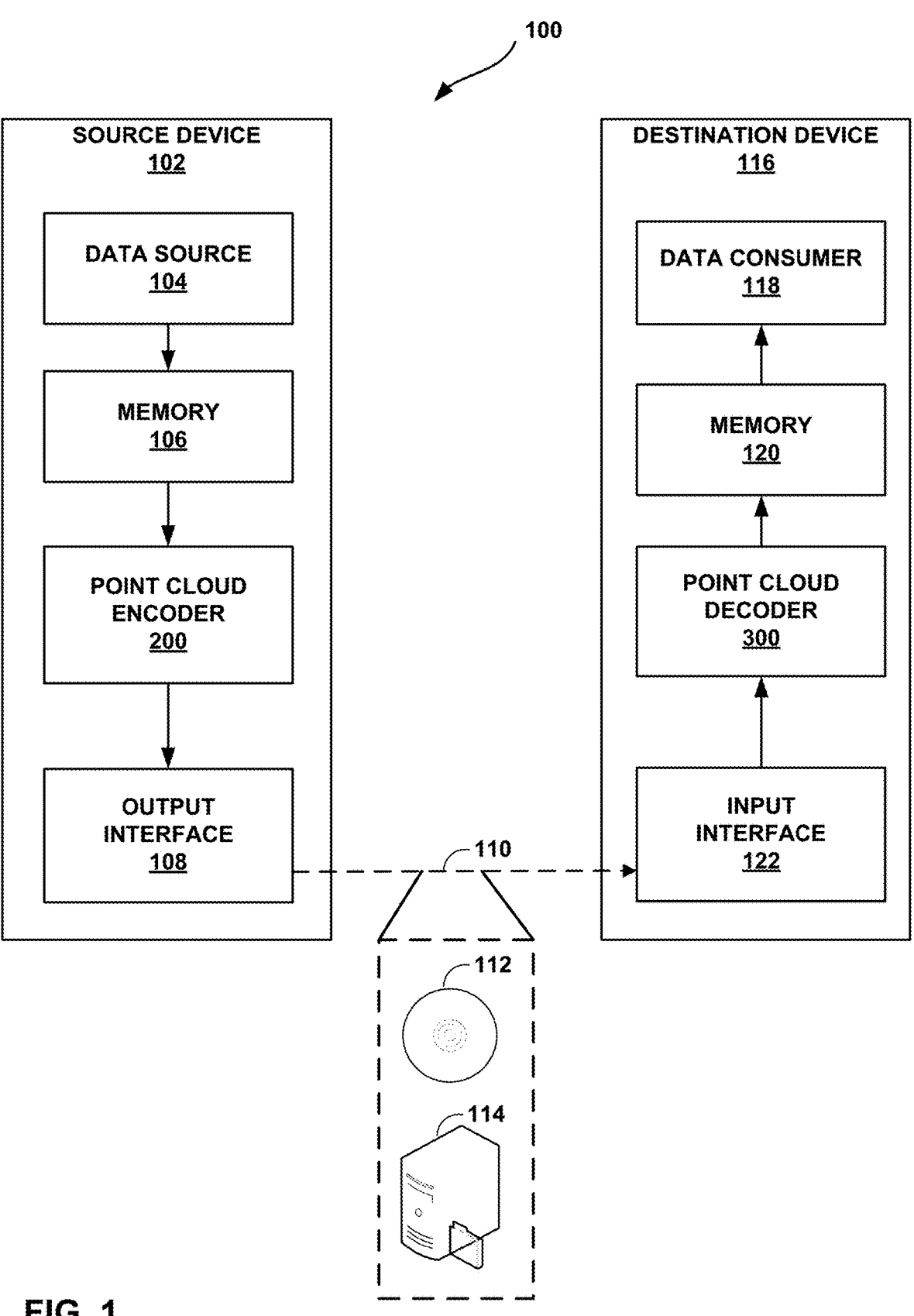
FIG. 1 is a block diagram illustrating an example point cloud encoding and decoding system that may perform the techniques of this disclosure.

A point cloud (PC) is a 3D data representation for tasks like virtual reality (VR) and mixed reality (MR), autonomous driving, cultural heritage, etc. Point clouds are a set of points in 3D space, represented by their 3D coordinates (x, y, z) referred to as the geometry. Each point may also be associated with multiple attributes such as color, normal vectors, and reflectance. Depending on the target application and the point cloud acquisition methods, the point cloud can be categorized into point cloud scenes and point cloud objects. Point cloud scenes may be captured using LiDAR sensors and may be dynamically acquired.

Point cloud objects can be subdivided into static point clouds and dynamic point clouds. A static point cloud is a single object. A dynamic point cloud is a time-varying point cloud including a sequence of point cloud instances. Each instance of a dynamic point cloud is a static point cloud. Dynamic time-varying point clouds may be used in AR/VR, volumetric video streaming, and telepresence, and can be generated using 3D models, i.e., CGI, or captured from real-world scenarios using various methods such as multiple cameras with depth sensors surrounding the object. These point clouds are dense photo-realistic point clouds that can have a massive number of points, especially in high precision or large-scale captures (millions of points per frame with up to 60 frames per second (FPS)). Therefore, efficient point cloud compression (PCC) is useful to enable practical usage in VR and MR applications.

The Moving Picture Experts Group (MPEG) has approved two PCC (point cloud compression) standards: (1)

S. Schwarz, M. Preda, V. Baroncini, M. Budagavi, P. Cesar, P. A. Chou, R. A. Cohen, M. Krivoku'ca, S. Lasserre, Z. Li et al., "Emerging MPEG standards for point cloud compression," IEEE Journal on Emerging and Selected Topics in Circuits and Systems, vol. 9, no. 1, pp. 133-148, 2018, and (2) D. Graziosi, O. Nakagami, S. Kuma, A. Zaghetto, T. Suzuki, and A. Tabatabai, "An overview of ongoing point cloud compression standardization activities: Video-based (v-pcc) and geometry-based (g-pcc)," APSIPA Transactions on Signal and Information Processing, vol. 9, 2020. MPEG has approved Geometry-based Point Cloud Compression (G-PCC) standard: "MPEG-PCC-TMC13: Geometry Based Point Cloud Compression G-PCC," 2021, available at github.com/MPEGGroup/mpeg-pcc-tmc13. MPEG has approved Video-based Point Cloud Compression (V-PCC): "MPEG-PCC-TMC2: Video Based Point Cloud Compression VPCC," 2022, available at github.com/MPEGGroup/mpeg-pcc-tmc2.

G-PCC includes octree-geometry coding as a generic geometry coding tool and a predictive geometry coding (tree-based) tool which is targeted toward LiDAR-based point clouds. G-PCC is still developing a triangle meshes or triangle soup (trisoup) based method to approximate the surface of the 3D model. V-PCC on the other hand encodes dynamic point clouds by projecting 3D points onto a 2D plane and then uses video codecs, e.g., High-Efficiency Video Coding (HEVC), to encode each frame overtime. MPEG has also proposed common test conditions (CTC) to evaluate test models: S. Schwarz, G. Martin-Cocher, D. Flynn, and M. Budagavi, "Common test conditions for point cloud compression," Document ISO/IECJTC1/SC29/WG11 w17766, Ljubljana, Slovenia, 2018.

As noted above, efficient point cloud compression is useful for applications such as virtual and mixed reality, autonomous driving, and cultural heritage. Some techniques, like m59617: Anique Akhtar, Zhu Li, Geert Van der Auwera, Adarsh Krishnan Ramasubramonian, Luong Pham Van, Marta Karczewicz, Dynamic Point Cloud Geometry Compression using Sparse Convolutions, MPEG-137 Online, Doc. m59617, April 2022, and m60307: Anique Akhtar, Zhu Li, Geert Van der Auwera, Adarsh Krishnan Ramasubramonian, Marta Karczewicz, [AI-3DGC][EE5.3 Test 2] Results dynamic point cloud compression, MPEG-139 Online, Doc. M60307, July 2022, use deep learning-based point cloud compression for dense dynamic point clouds using deep learning network consisting of an encoder and decoder module.

Research into performing point cloud compression using deep learning solutions is ongoing. A point cloud generally includes a collection of points, as well as attributes for the points. The points correspond to positions in a three-dimensional space, e.g., having X-, Y-, and Z-coordinates. The attributes may include, for example, color, reflectance, brightness, surface normals, or the like. Since point clouds have both geometry and attributes, there have been solutions proposed for point cloud geometry compression, point cloud attribute compression, as well as joint point cloud geometry and attribute compression.

Deep learning-based solutions typically perform well when applied to geometry compression. The techniques of this disclosure include using geometry compression from one codec and attribute compression from another codec. For example, a deep learning-based geometry compression scheme may be combined with a non-deep learning-based attribute compression scheme. These techniques may provide flexibility to the compression framework and created a strong baseline for deep learning-based point cloud attribute compression.

These techniques may further include use of multi-scale attribute compression with deep learning-based post-processing. Heuristic testing has shown that most of the compression bits are consumed by attribute coding. Therefore, creating an effective attribute compression scheme is important to achieving a good compression performance. The multi-scale attribute compression scheme may improve the overall compression performance of the coding framework. In particular, per techniques of this disclosure, after decoding downscaled attribute data, a residual learning network may upscale the attribute data to the original, full scale resolution. In this manner, significant bitrate savings may be achieved when transporting the attribute data, while achieving a high accuracy when upscaling the attribute data to the original, full scale.

Some coding techniques include a deep learning-based lossy point cloud geometry compression scheme for dynamic point cloud compression. The lossy geometry scheme predicts the latent representation of a current frame using a previous frame by employing a prediction network. The framework performs P-frame inter-frame point cloud encoding, where the current frame is encoded with reference to the previously decoded frame. The architecture is implemented using sparse convolution neural network (CNN) with sparse tensors. The architecture employs convolution on target coordinates to map the latent representation of the previous frame to the downsampled coordinates of the current frame to predict the current frame's feature embedding. The framework transmits the residual of the predicted features and the actual features by compressing them using a learned probabilistic factorized entropy model. Compared with G-PCC and V-PCC, these techniques demonstrate better geometry compression performance on dense point clouds with an efficient encoding/decoding runtime.

In one or more examples, this disclosure describes a flexible configuration of the deep learning-based framework where rather than having a joint geometry and attribute compression scheme, the example techniques use a recoloring scheme (as one example) to generate attributes for the reconstructed point cloud and employ traditional attribute compression schemes. One or more of the example techniques described in this disclosure may utilize G-PCC's recoloring scheme to get attributes of the target point cloud from the source point cloud. G-PCC's recoloring scheme employs weighted distance based nearest neighbors in the source point cloud to calculate attributes of the target point cloud. Accordingly, in one or more examples, the example techniques may allow use of an attribute compression from a different codec and the geometry compression from a different codec.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110.

Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a point cloud encoder 200, and an output interface 108. Destination device 116 includes an input interface 122, a point cloud decoder 300, a memory 120, and a data consumer 118. In accordance with this disclosure, point cloud encoder 200 of source device 102 and point cloud decoder 300 of destination device 116 may be configured to apply the techniques of this disclosure related to attribute coding for point cloud compression. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to attribute coding for point cloud compression. Source device 102 and destination device 116 are merely examples of such devices in which source device 102 generates coded data for transmission to destination device 116. This disclosure refers to a "coding" device as a device that performs coding (encoding and/or decoding) of data. Thus, point cloud encoder 200 and point cloud decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to point cloud encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, point cloud encoder 200 encodes the captured, pre-captured, or computer-generated data. Point cloud encoder 200 may rearrange the frames from the received order (sometimes referred to as "display order") into a coding order for coding. Point cloud encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from point cloud decoder 300. Additionally or alternatively, memory 106 and memory 120 may store software instructions executable by, e.g., point cloud encoder 200 and point cloud decoder 300, respectively. Although memory 106 and memory 120 are shown separately from point cloud encoder 200 and point cloud decoder 300 in this example, it should be understood that point cloud encoder 200 and point cloud decoder 300 may also include internal memories for functionally similar or equivalent purposes. Furthermore, memory 106 and memory 120 may store encoded data, e.g., output from point cloud encoder 200 and input to point cloud decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to point cloud encoder 200 and/or output interface 108, and destination device 116 may include an SoC device to perform the functionality attributed to point cloud decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by point cloud encoder 200, which is also used by point cloud decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

Point cloud encoder 200 and point cloud decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of point cloud encoder 200 and point cloud decoder 300 may be included in one or more encoders or decoders, either of which may be integrated as part of a combined encoder/decoder (CODEC) in a respective device. A device including point cloud encoder 200 and/or point cloud decoder 300 may comprise one or more integrated circuits, microprocessors, and/or other types of devices.

Point cloud encoder 200 and point cloud decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, point cloud encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC1/SC29/WG11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in G-PCC DIS, ISO/IEC JTC1/SC29/WG11 w19088, Brussels, Belgium, January 2020, and a description of the codec is available in G-PCC Codec Description v6, ISO/IEC JTC1/SC29/WG11 w19091, Brussels, Belgium, January 2020.

A point cloud contains a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
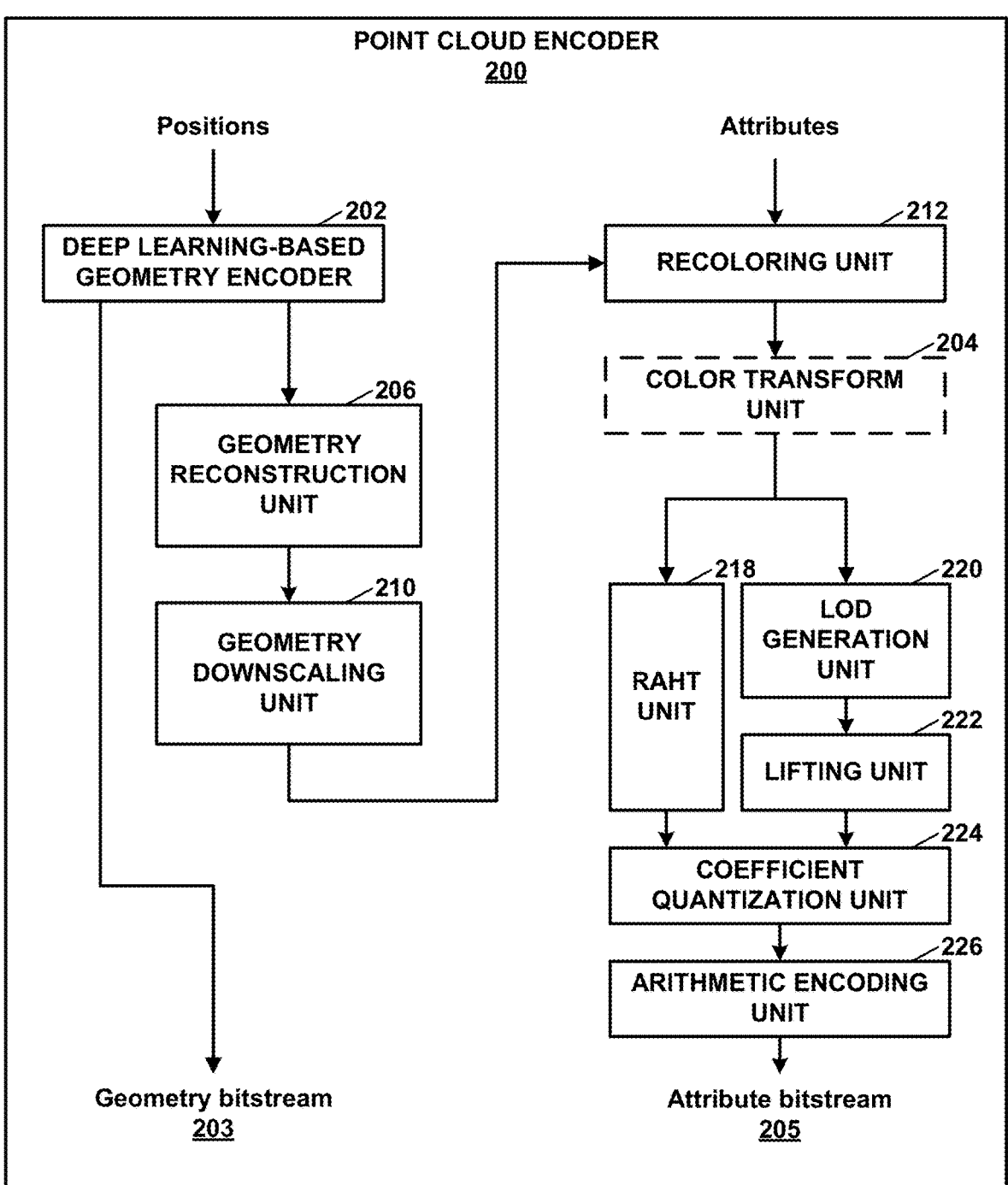
FIG. 2 is a block diagram illustrating an example point cloud encoder according to techniques of this disclosure.

FIG. 2 is a block diagram illustrating an example point cloud encoder 200. The modules shown are logical, and do not necessarily correspond one-to-one to implemented code in the reference implementation of G-PCC codec, i.e., TMC13 test model software studied by ISO/IEC MPEG (JTC1/SC29/WG11).

In both point cloud encoder 200 and point cloud decoder 300, point cloud positions are coded first. Attribute coding depends on the decoded geometry. The compressed geometry is typically represented as an octree from the root all the way down to a leaf level of individual voxels.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while Predicting is typically used for Category 3 data. However, either method may be used for any data, and, just like with the geometry codecs in G-PCC, the attribute coding method used to code the point cloud is specified in the bitstream.

The coding of the attributes may be conducted in a level-of-detail (LOD), where with each level of detail a finer representation of the point cloud attribute may be obtained. Each level of detail may be specified based on distance metric from the neighboring nodes or based on a sampling distance.

At point cloud encoder 200, the residuals obtained as the output of the coding methods for the attributes are quantized. The residuals may be obtained by subtracting the attribute value from a prediction that is derived based on the points in the neighborhood of the current point and based on the attribute values of points encoded previously. The quantized residuals may be coded using context adaptive arithmetic coding.

In the example of FIG. 2, point cloud encoder 200 includes deep learning-based geometry encoder 202, geometry reconstruction unit 206, geometry downscaling unit 210, recoloring unit 212, color transform unit 204, Region Adaptive Hierarchical Transform (RAHT) unit 218, LOD generation unit 220, lifting unit 222, coefficient quantization unit 224, and arithmetic encoding unit 226.

As shown in the example of FIG. 2, point cloud encoder 200 may obtain a set of positions of points in the point cloud and a set of attributes. Point cloud encoder 200 may obtain the set of positions of the points in the point cloud and the set of attributes from data source 104 (FIG. 1). The positions may include coordinates of points in a point cloud. The attributes may include information about the points in the point cloud, such as colors, reflectance, intensity, or the like, associated with the points in the point cloud. Deep learning-based geometry encoder 202 of point cloud encoder 200 may generate geometry bitstream 203 that includes an encoded representation of the positions of the points in the point cloud. Point cloud encoder 200 may also generate attribute bitstream 205 that includes an encoded representation of the set of attributes.

After encoding the geometry information, geometry reconstruction unit 206 may decode and reconstruct the geometry information. Geometry downscaling unit 210 may downscale the geometry information. As noted above, the geometry information may be represented using an octree. A root node of the octree may be partitioned into eight sub-nodes. For each node of the octree, the node may be further partitioned into eight sub-nodes, including dividing the node in half along the X-, Y-, and Z-dimensions. Such partitioning may continue until, e.g., reaching a smallest sized node for the octree, referred to as a leaf node of the octree. That is, a leaf node has no child nodes and is unpartitioned.

In order to downscale the octree, geometry downscaling unit 210 may determine a node has eight leaf subnodes, and determine a number of the eight leaf subnodes that is occupied. If the number is above a threshold (e.g., zero), geometry downscaling unit 210 may represent the node as an occupied leaf node in a downscaled octree. Otherwise, if the number is less than or equal to the threshold, geometry downscaling unit 210 may represent the node as an unoccupied leaf node in the downscaled octree. For example, if the threshold is zero, all of the eight leaf sub-nodes would need to be unoccupied to represent the node as an unoccupied leaf node in the downscaled octree, otherwise the node would be represented as an occupied leaf node in the downscaled octree.

After downscaling the geometry information, recoloring unit 212 may apply the attribute information to the points of the downscaled octree. For example, recoloring unit 212 may similarly downscale the original attribute information by the same degree as the geometry information. Such downscaling may include culling the attribute data, blending attribute data, or otherwise reducing the attribute data such that the downscaled attribute data can be applied to the downscaled geometry.

Color transform unit 204 may transform color information of the attributes to a different domain. For example, color transform unit 204 may transform color information from an RGB color space to a YCbCr color space.

Furthermore, RAHT unit 218 may apply RAHT coding to the attributes of the reconstructed points. In some examples, under RAHT, the attributes of a block of 2×2×2 point positions are taken and transformed along one direction to obtain four low (L) and four high (H) frequency nodes. Subsequently, the four low frequency nodes (L) are transformed in a second direction to obtain two low (LL) and two high (LH) frequency nodes. The two low frequency nodes (LL) are transformed along a third direction to obtain one low (LLL) and one high (LLH) frequency node. The low frequency node LLL corresponds to DC coefficients and the high frequency nodes H, LH, and LLH correspond to AC coefficients. The transformation in each direction may be a 1-D transform with two coefficient weights. The low frequency coefficients may be taken as coefficients of the 2×2×2 block for the next higher level of RAHT transform and the AC coefficients are encoded without changes; such transformations continue until the top root node. The tree traversal for encoding is from top to bottom used to calculate the weights to be used for the coefficients; the transform order is from bottom to top. The coefficients may then be quantized and coded.

Alternatively or additionally, LOD generation unit 220 and lifting unit 222 may apply LOD processing and lifting, respectively, to the attributes of the reconstructed points. LOD generation is used to split the attributes into different refinement levels. Each refinement level provides a refinement to the attributes of the point cloud. The first refinement level provides a coarse approximation and contains few points; the subsequent refinement level typically contains more points, and so on. The refinement levels may be constructed using a distance-based metric or may also use one or more other classification criteria (e.g., subsampling from a particular order). Thus, all the reconstructed points may be included in a refinement level. Each level of detail may be produced by taking a union of all points up to particular refinement level: e.g., LOD1 is obtained based on refinement level RL1, LOD2 is obtained based on RL1 and RL2, . . . LODN is obtained by union of RL1, RL2, . . . RLN. In some cases, LOD generation may be followed by a prediction scheme (e.g., predicting transform) where attributes associated with each point in the LOD are predicted from a weighted average of preceding points, and the residual is quantized and entropy coded. The lifting scheme builds on top of the predicting transform mechanism, where an update operator is used to update the coefficients and an adaptive quantization of the coefficients is performed.

RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. Point cloud encoder 200 may output these syntax elements in attribute bitstream 205. Attribute bitstream 205 may also include other syntax elements, including non-arithmetically encoded syntax elements.

In some examples, geometry downscaling unit 210 may downscale the geometry data by a certain amount represented by a particular value, such as a downscaling factor. Point cloud encoder 200 may encode the value as a parameter of a parameter set, such as a sequence parameter set (SPS) or an attribute parameter set (APS), a slice header, a frame header, or other high level syntax (HLS). In some examples, the downscaling factor may also indicate an amount by which to downscale the attribute data prior to recoloring. In some examples, point cloud encoder 200 may encode a second value, separate from the first value, indicative of the amount by which to downscale the attribute data.

Figure 3:
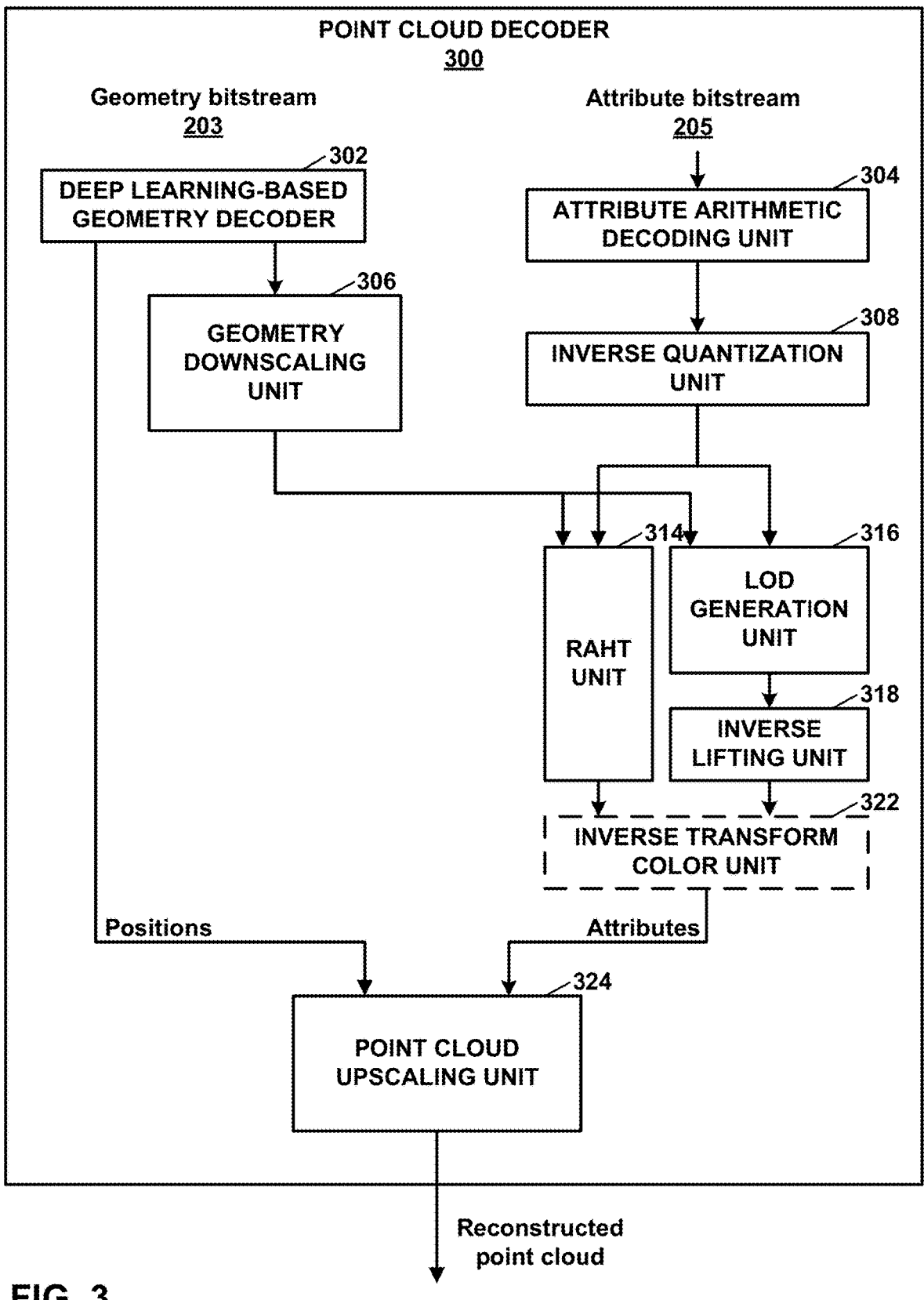
FIG. 3 is a block diagram illustrating an example point cloud decoder according to techniques of this disclosure.

FIG. 3 is a block diagram illustrating an example point cloud decoder 300. In the example of FIG. 3, point cloud decoder 300 includes deep learning-based geometry decoder 302, attribute arithmetic decoding unit 304, geometry downscaling unit 306, inverse quantization unit 308, RAHT unit

314, LoD generation unit 316, inverse lifting unit 318, inverse transform color unit 322, and point cloud upscaling unit 324.

Point cloud decoder 300 may receive a geometry bitstream 203 and attribute bitstream 205. Deep learning-based geometry decoder 302 generally decodes geometry data of geometry bitstream 203. Attribute arithmetic decoding unit 304 of decoder 300 may apply arithmetic decoding (e.g., Context-Adaptive Binary Arithmetic Coding (CABAC) or other type of arithmetic decoding) to syntax elements in attribute bitstream 205 to decode attribute bitstream 205.

In general, attribute bitstream 250 represents a downscaled version of attribute data relative to the geometry data of geometry bitstream 203. Therefore, geometry downscaling unit 306 may downscale the reproduced geometry data from deep learning-based geometry decoder 302, e.g., according to a downscaling value. Point cloud decoder 300 may decode the downscale value from high level syntax (HLS) data, such as a sequence parameter set (SPS), attribute parameter set (APS), slice header, frame header, or the like. Geometry downscaling unit 306 may downscale the geometry data according to the downscaling factor.

Additionally, inverse quantization unit 308 may inverse quantize attribute values. The attribute values may be based on syntax elements obtained from attribute bitstream 205 (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. RAHT decoding is done from the top to the bottom of the tree. At each level, the low and high frequency coefficients that are derived from the inverse quantization process are used to derive the constituent values. At the leaf node, the values derived correspond to the attribute values of the coefficients. The weight derivation process for the points is similar to the process used at point cloud encoder 200. Alternatively, LOD generation unit 316 and inverse lifting unit 318 may determine color values for points of the point cloud using a level of detail-based technique. LOD generation unit 316 decodes each LOD giving progressively finer representations of the attribute of points. With a predicting transform, LOD generation unit 316 derives the prediction of the point from a weighted sum of points that are in prior LODs, or previously reconstructed in the same LOD. LOD generation unit 316 may add the prediction to the residual (which is obtained after inverse quantization) to obtain the reconstructed value of the attribute. When the lifting scheme is used, LOD generation unit 316 may also include an update operator to update the coefficients used to derive the attribute values. LOD generation unit 316 may also apply an inverse adaptive quantization in this case.

Furthermore, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse color transform unit 322 may transform color information from the YCbCr color space to the RGB color space.

After decoding both geometry information and attribute information, point cloud upscaling unit 324 may reconstruct the point cloud. In particular, point cloud upscaling unit 324 may upscale the attribute information to the scale of the geometry information. Point cloud upscaling unit 324 may upscale the attribute information according to the downscaling factor. Alternatively, point cloud decoder 300 may decode a separate value representing an amount of upscaling to be applied to the attribute information. Ultimately, point cloud upscaling unit 324 may apply the upscaled attribute information to the points of the geometry information to reconstruct the point cloud.

Per the techniques of this disclosure, point cloud upscaling unit 324 may be a deep learning-based residual learning network for attribute upsampling. That is, point cloud upscaling unit 324 may initially be trained on data including original, full scale attribute data, and corresponding downscaled, decoded and reconstructed attribute data. Point cloud upscaling unit 324 may be trained to upscale the downscaled, decoded and reconstructed attribute data to the full scale and compare the differences between the original, full scale attribute data and the upscaled attribute data (i.e., the residual), and update the internal network model accordingly (e.g., by changing weighting values within the model). The residual learning network may be considered trained when differences between the original attribute data and the upscaled attribute data are below a predetermined threshold value.

The various units of FIG. 2 and FIG. 3 are illustrated to assist with understanding the operations performed by encoder 200 and decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

As described above, machine learning, such as deep learning, techniques may be used for encoding and decoding of point cloud data. The techniques of this disclosure include the use of a deep learning-based lossy point cloud geometry compression scheme for dynamic point cloud compression. A lossy geometry scheme predicts the latent representation of the current frame using the previous frame by employing a prediction network. The example techniques perform P-frame inter-frame point cloud encoding where the current frame is encoded with reference to a previously decoded frame. The architecture may be implemented using sparse convolution neural network (CNN) with sparse tensors. The example architecture employs convolution on target coordinates to map the latent representation of the previous frame to the downsampled coordinates of the current frame to predict the current frame's feature embedding. The encoder transmits the residual of the predicted features and the actual features by compressing them using a learned probabilistic factorized entropy model. Compared with G-PCC and V-PCC, the machine learning techniques show better compression performance on dense point clouds with efficient encoding/decoding runtime.

By employing downscaling and subsequent upscaling to the attribute information, further flexibility may be provided.

The majority of the bitrate in previous encoding schemes has been consumed by the attribute information. Any improvement in the attribute compression scheme may greatly improve the overall coding efficiency of the framework. Thus, according to the techniques of this disclosure, point cloud encoder 200 may downscale the attribute information prior to encoding, and point cloud decoder 300 may decode and then upscale the attribute information.

High-level syntax (HLS) data may be signaled by point cloud encoder 200 and received by point cloud decoder 300. The HLS data may include an attribute coding type employed to code the recolored attributes for point cloud decoder 300 to reconstruct the attribute values. This coding method, for example, G-PCC's Region Adaptive Hierarchical Transform (RAHT), can be signaled in a parameter set, for example, the sequence parameter set (SPS) or attribute parameter set (APS) as an identifier. The part of the bitstream that carries the coded attribute bits is, for example, a NALU. A list of coding methods may be specified, each coding method provides a means to code the attributes of the point cloud (optionally, they may also code the geometry in a lossless manner). An index to this list may be signaled in the bitstream to indicate the coding method used to code the attributes. This index may be signaled in a parameter set (e.g., APS, SPS) or other means. When deep learning mechanisms are used for recoloring or decoding, parameters/coefficients corresponding to recoloring or decoding may also be signaled in the bitstream.

Figure 4:
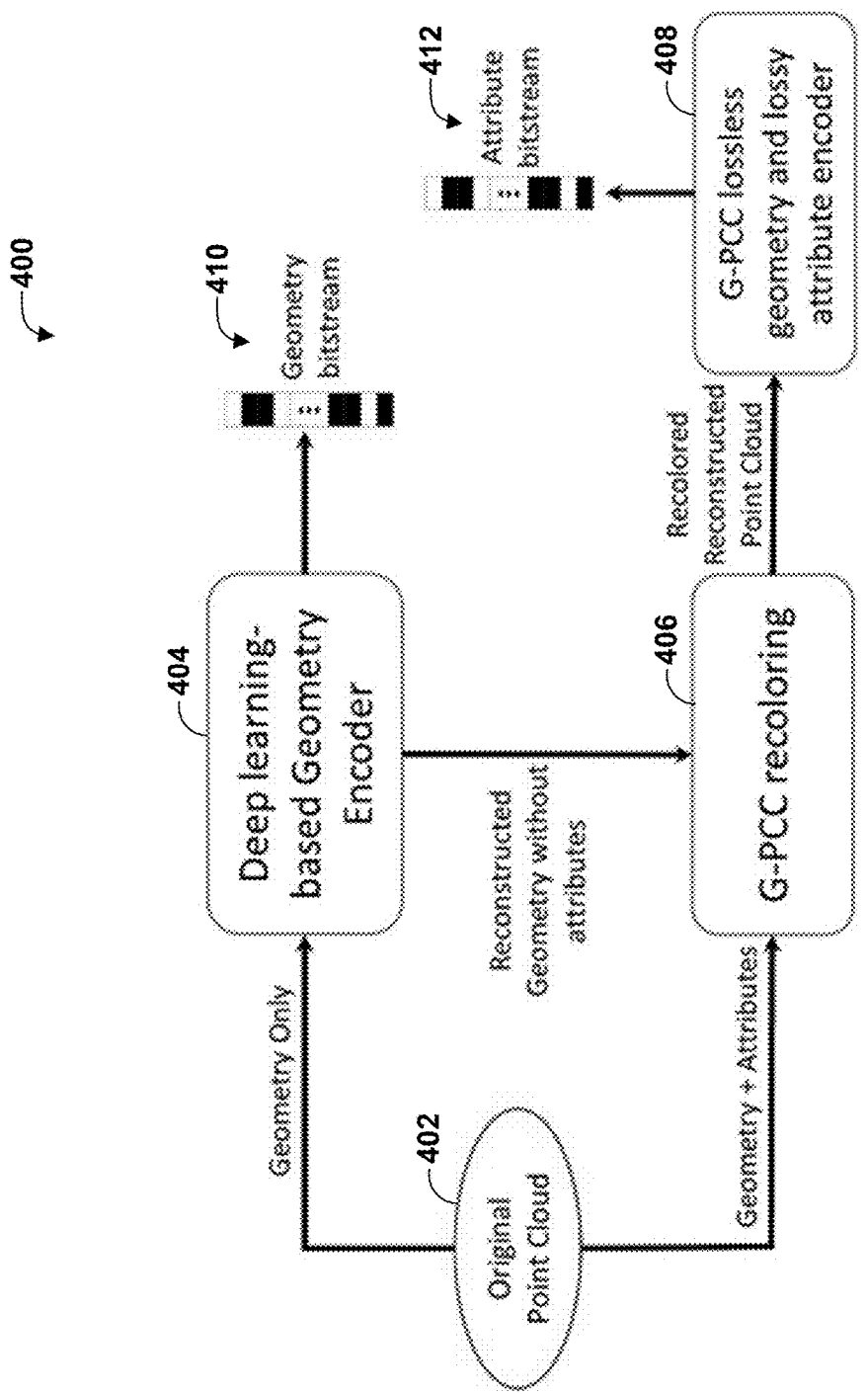
FIG. 4 is a conceptual diagram illustrating an example encoding framework according to certain examples of the techniques of this disclosure.
Figure 5:
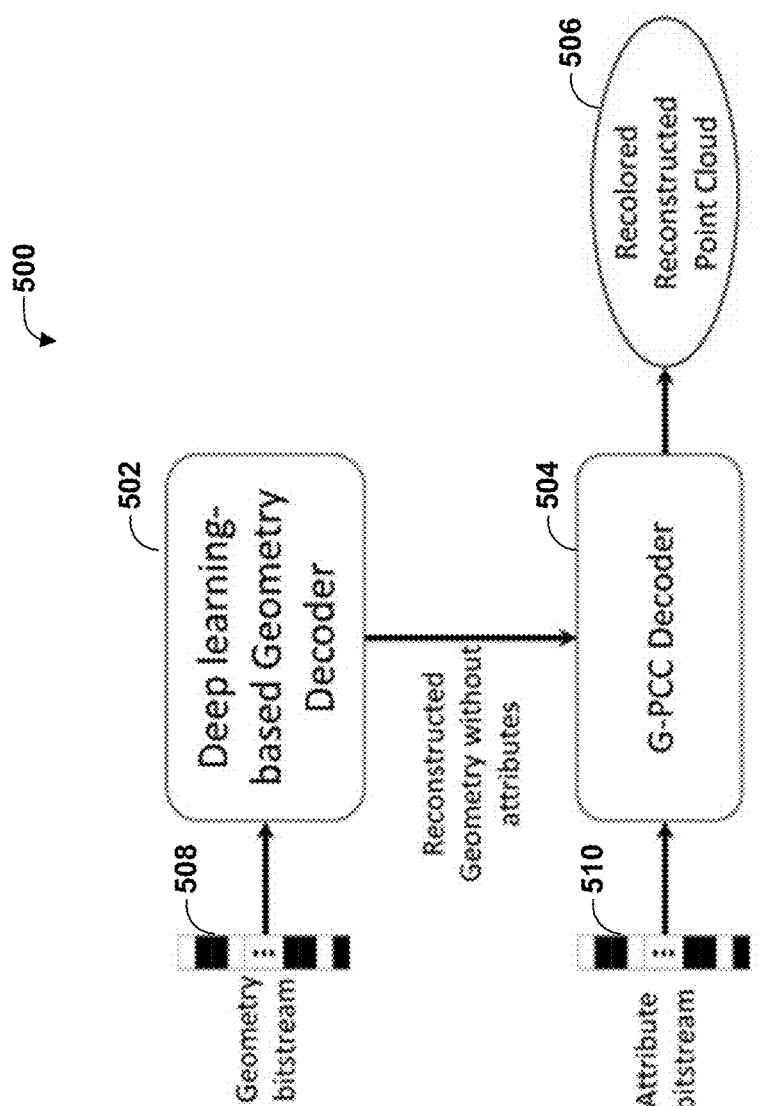
FIG. 5 is a conceptual diagram illustrating an example decoding framework according to certain examples of the techniques of this disclosure.

FIG. 4 is a block diagram illustrating an example encoding framework 400. FIG. 5 is a block diagram illustrating an example decoding framework 500. In FIG. 4, encoding framework 400 includes deep learning-based geometry encoder 404, G-PCC recoloring unit 406, and G-PCC lossless geometry and lossy attribute encoder 408. In general, encoding framework 400 may correspond to point cloud encoder 200 of FIGS. 1 and 2, where deep learning-based geometry encoder 404 may correspond to deep learning-based geometry encoder 202, G-PCC recoloring unit 406 may correspond to recoloring unit 212, and G-PCC lossless geometry and lossy attribute encoder 408 may correspond to any or all of color transform unit 204, RAHT unit 218, LOD generation unit 220, lifting unit 222, coefficient quantization unit 224, and arithmetic encoding unit 226. In this example, original point cloud 402 is provided to both deep learning-based geometry encoder 400 and G-PCC recoloring unit 406. Deep learning-based geometry encoder 404 encodes geometry information of original point cloud 402 and forms geometry bitstream 410 including encoded geometry information for original point cloud 402.

Deep learning-based geometry encoder 400 also decodes and reconstructs the geometry information, e.g., an octree including nodes indicating whether points are present in the nodes (i.e., whether the nodes are occupied). Occupied nodes may be partitioned into eight sub-nodes, each of which may include indications of being occupied. G-PCC recoloring unit 406 may receive the reconstructed geometry information from deep learning-based geometry encoder 404 and use the geometry and attribute information of original point cloud 402 to recolor the reconstructed geometry. G-PCC lossless geometry and lossy attribute encoder 408 may then encode the recolored, reconstructed geometry to form attribute bitstream 412.

Decoding framework 500 of FIG. 5 includes deep learning-based geometry decoder 502 (which may correspond to deep learning-based geometry decoder 302) and G-PCC decoder 504 (which may correspond to attribute arithmetic decoding unit 304, inverse quantization unit 308, RAHT unit 314, LOD generation unit 316, inverse lifting unit 318, and inverse transform color unit 322). In this example, deep learning-based geometry decoder 502 receives geometry bitstream 508. Deep learning-based geometry decoder 502 decodes geometry bitstream 508 and reconstructs the geometry information. G-PCC decoder 504 receives attribute bitstream 510 and uses the reconstructed geometry information to decode attribute bitstream 510 and reconstruct the point cloud. For example, G-PCC decoder 504 may apply the decoded attribute information to the reconstructed geometry information to form recolored reconstructed point cloud 506.

In FIGS. 4 and 5, encoding framework 400 compresses and decoding framework 500 decompresses the geometry using a deep learning-based encoder-decoder to obtain a reconstructed point cloud. The reconstructed point cloud differs in geometry from the original point cloud and may not simply be uses as the original point cloud's attributes. In some examples, encoding framework 400 compresses and decoding framework 500 may use G-PCC's recoloring scheme to change the original point cloud's attributes to create newer attributes for the reconstructed point cloud. The recolored point cloud has geometry of the reconstructed point cloud and attributes that were derived from the original point cloud. The recolored point cloud is encoded by G-PCC, where the geometry was encoded in a lossless manner and the attributes were encoded in a lossy manner. The reconstructed geometry is combined with reconstructed attributes to obtain the reconstructed point cloud.

The following changes/flexibility may be added to the framework illustrated in FIGS. 4 and 5. As one example, although FIGS. 4 and 5 illustrate deep learning-based encoder and decoder, the geometry encoder or decoder is not necessarily limited to deep learning-based geometry encoder or decoder, but any geometry encoder or decoder could be employed.

For the recoloring, encoding framework 400 compresses and decoding framework 500 may employ a weighted distance based nearest neighbor search-based recoloring scheme employed in the G-PCC standard: WG7, MPEG 3D Graphics Coding, G-PCC codec description, Doc. N00271, January 2022. The recoloring scheme may change the attributes to fit the newer geometry. Any recoloring scheme that can alter the values of the attributes and/or their correspondence with the geometry could be employed as a recoloring scheme. The "recoloring" algorithm need not be limited to the "recoloring" of color attributes, for example, RGB or YCbCr, but can more generally be an algorithm that recomputes attribute values such as normal vectors, reflectance, etc., from point positions in one geometry to point positions in a second geometry. Deep learning mechanisms could also be applied to perform recoloring.

As illustrated in FIG. 4, the G-PCC lossless geometry and lossy attribute encoder is shown. The example techniques are not limited to G-PCC lossless geometry and lossy attribute encoding, for example, G-PCC's Region Adaptive Hierarchical Transform (RAHT). This method can be employed with any encoding scheme including another deep learning-based encoding or using V-PCC. Furthermore, rather than employing a "lossless geometry and lossy attribute encoding" the example may use any "lossy attribute encoder". Deep learning mechanisms could also be applied to perform decoding.

Encoding framework 400 and decoding framework 500 use a geometry encoder/decoder from one codec and an attribute encoder/decoder from a separate codec to create a complete codec framework that would outperform the two individual codecs. In lossy point cloud compression, the geometry changes after compression, and attaching the attributes from a separate codec to their corresponding geometry is challenging. Thus, in encoding framework 400 and point cloud decoding framework 500, a recoloring scheme is used to attach attributes along with their corresponding geometry.

Figure 6:
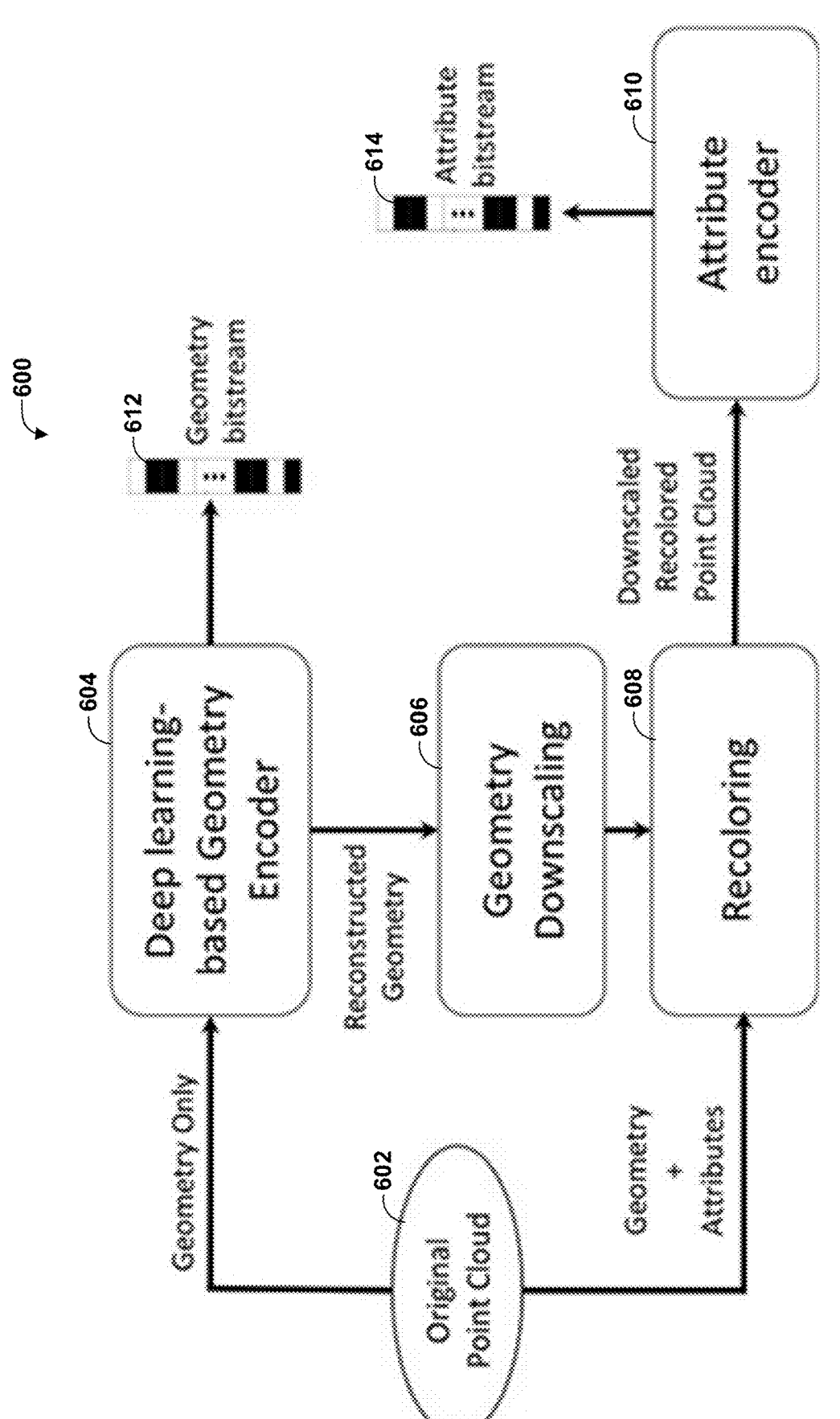
FIG. 6 is a block diagram illustrating an example point cloud encoding framework according to the techniques of this disclosure.

FIG. 6 is a block diagram illustrating an example point cloud encoding framework 600 according to the techniques of this disclosure. In this example, point cloud encoding framework 600 includes deep learning-based geometry encoder 604 (which may correspond to deep learning-based geometry encoder 202), geometry downscaling unit 606 (which may correspond to geometry downscaling unit 210), recoloring unit 608 (which may correspond to recoloring unit 212), and attribute encoder 610 (which may correspond to color transform unit 204, RAHT unit 218, LOD generation unit 220, lifting unit 222, coefficient quantization unit 224, and arithmetic encoding unit 226). Point cloud encoding framework 600 differs from encoding framework 400 in that point cloud encoding framework 600 includes geometry downscaling unit 606 and attribute encoder 610 encodes a downscaled version of attribute information, as discussed in greater detail below.

In general, deep learning-based geometry encoder 604 receives geometry information of original point cloud 602, while recoloring unit 608 receives both geometry and attribute information of original point cloud 602. Deep learning-based geometry encoder 604 encodes the geometry information to form geometry bitstream 612. Deep learning-based geometry encoder 604 decodes and reconstructs the geometry information and provides the reconstructed geometry information to geometry downscaling unit 606. Geometry downscaling unit 606 may then downscale the geometry information and provide downscaled geometry information to recoloring unit 608. Recoloring unit 608 may form a recolored, downscaled point cloud from the downscaled geometry information and the original geometry and attribute information of original point cloud 602. Attribute encoder 610 may then encode attribute information of the recolored, downscaled point cloud to form attribute bitstream 614.

Figure 7:
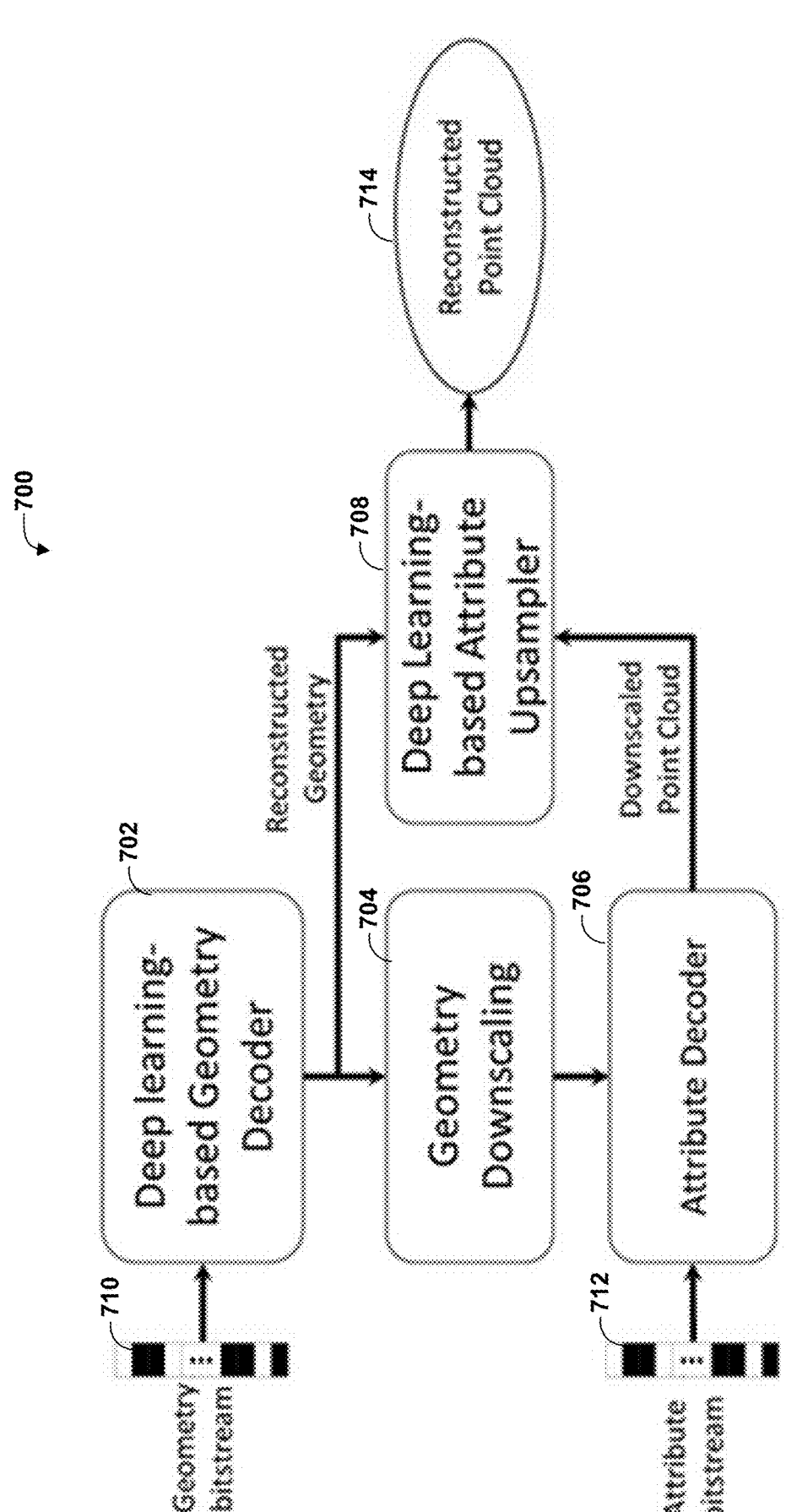
FIG. 7 is a block diagram illustrating an example point cloud decoding framework according to the techniques of this disclosure.

FIG. 7 is a block diagram illustrating an example point cloud decoding framework 700 according to the techniques of this disclosure. In this example, point cloud decoding framework 700 includes deep learning-based geometry decoder 702, geometry downscaling unit 704, attribute decoder 706, and deep learning-based attribute upsampler 708. Deep learning-based geometry decoder 702 may correspond to deep learning-based geometry decoder 302, geometry downscaling unit 704 may correspond to geometry downscaling unit 306, attribute decoder 706 may correspond to attribute arithmetic decoding unit 304, inverse quantization unit 308, RAHT unit 314, LOD generation unit 316, inverse lifting unit 318, and inverse transform color unit 322, and deep learning-based attribute upsampler 708 may correspond to point cloud upsampling unit 324.

In general, deep learning-based geometry decoder 702 receives geometry bitstream 710. Deep learning-based geometry decoder 702 decodes geometry information of geometry bitstream 710 and reconstructs geometry information from the decoded geometry information. Geometry downscaling unit 704 downscales the geometry information to form downscaled geometry information and provides the downscaled geometry information to attribute decoder 706. Attribute decoder 706 receives attribute bitstream 712, including encoded attribute information, and decodes the encoded attribute information. Attribute decoder 706 may provide the decoded attribute information to deep learning-based attribute upsampler 708, which may also receive the original reconstructed geometry information, and upscale the attribute information to the scale of the reconstructed geometry information. Deep learning-based attribute upsampler 708 may also apply the upscaled attribute information to the reconstructed geometry information to form reconstructed point cloud 714.

According to the techniques of this disclosure, attribute encoder 610 encodes downscaled attributes to save attribute bits, which may increase coding efficiency. The geometry information is compressed using deep learning-based geometry encoder 604, then decoded and reconstructed to obtain a reconstructed point cloud. Geometry downscaling unit 606 may downscale the reconstructed geometry information using a variety of downscaling factors (e.g., 1, 2, 4, 8, etc.) as discussed in greater detail below. Recoloring unit 608 then recolors the downscaled geometry using the original point cloud attributes according to a recoloring scheme, such as the G-PCC recoloring scheme. Attribute encoder 610 may then encode the recolored point cloud attributes with an attribute coding scheme (lossy or lossless), such as G-PCC RAHT or G-PCC predictive/lifting transform.

At point cloud decoding framework 700, geometry bitstream 710 is decoded by deep learning-based geometry decoder 702. The reconstructed geometry is downscaled by geometry downscaling unit 704, then provided to attribute decoder 706. Attribute decoder 706 may perform inverse GPCC RAHT or predictive/lifting transform. Attribute decoder 706 may attach the decoded, downscaled attributes to their corresponding downscaled reconstructed geometry to obtain a downscaled point cloud. As an example, deep learning-based point cloud attribute upsampler is employed to upsample the attributes and map the upsampled attributes to the reconstructed geometry.

In some examples, explicit downscaling of reconstructed geometry may not be performed. For example, the geometry decoding process may itself include one or more downscaled versions of geometry that are upscaled/processed to obtain the reconstructed geometry. The one or more downscaled versions of geometry may be passed to the attribute decoder and used instead of the downscaled reconstructed geometry. This may avoid the need to perform the explicit downscaling operation on the reconstructed geometry, thus saving processing time and resources.

Figure 8B:
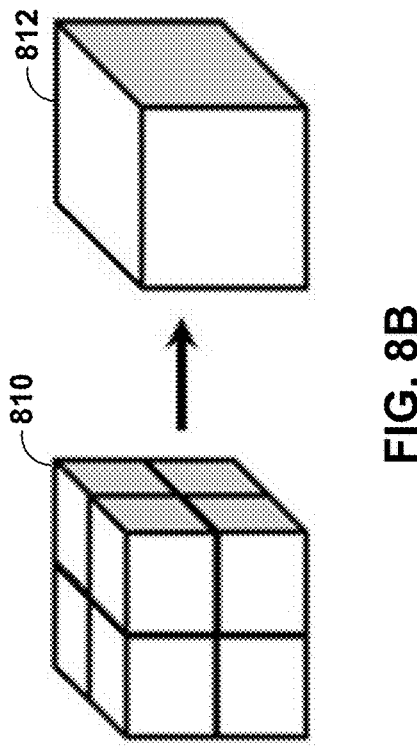
FIGS. 8A and 8B are conceptual diagrams illustrating examples of downscaling voxels of a point cloud.
Figure 8A:
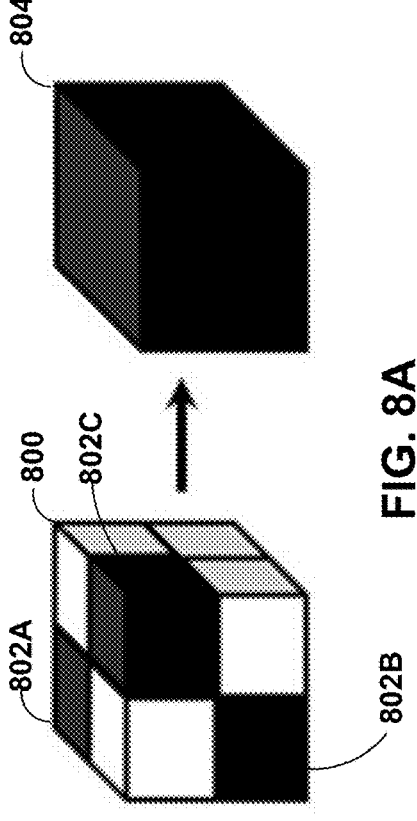

FIGS. 8A and 8B are conceptual diagrams illustrating examples of downscaling voxels of a point cloud. FIG. 8A depicts an example voxel 800 including sub-voxels 802A, 802B, and 802C, each of which is occupied, and other sub-voxels are non-occupied. In this example, downscaling of voxel 800 results in downscaled voxel 804 that is occupied, because sub-voxels 802A, 802B, and 802C are occupied. FIG. 8B depicts an example voxel 810 including all non-occupied sub-voxels. Thus, in this example, downscaling of voxel 810 results in downscaled voxel 812 that is non-occupied.

In some examples, geometry downscaling unit 306 or geometry downscaling unit 704 may employ a K×K×K voxel grid downscaling, where K is a value defining a downscaling factor. If K is 2, then the point cloud is divided into a 2×2×2 voxel grid, where each voxel is a point in the 3D space. Then the 8 voxels within the 2×2×2 voxel grid are merged into a single voxel. In some examples, the final voxel is considered occupied if any of the 8 voxels inside were also occupied. In some examples, the final voxel is considered occupied if a number of sub-voxels that are occupied exceeds a threshold value.

Figure 9:
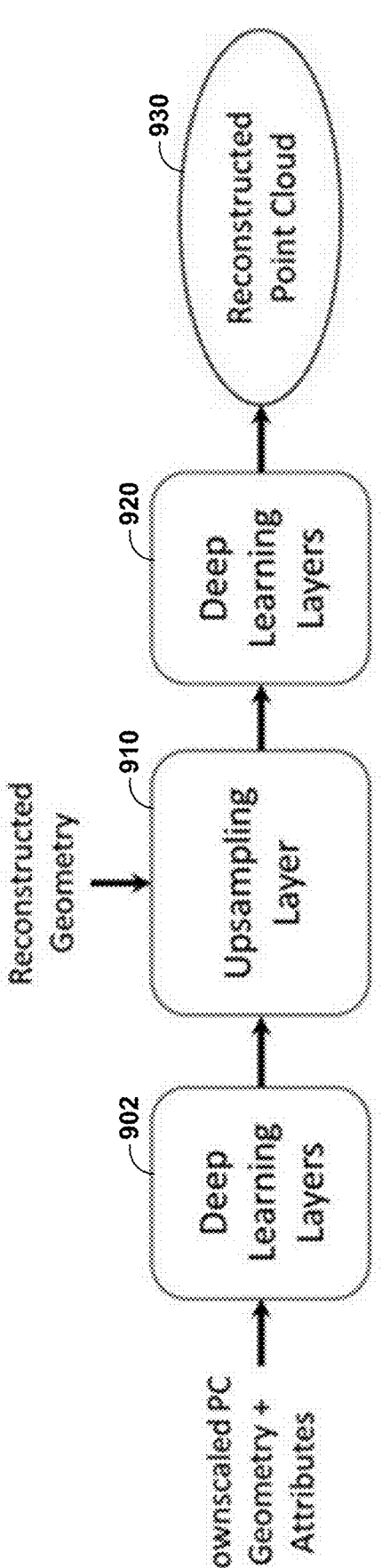
FIG. 9 is a block diagram illustrating an example set of stages that may be included in a deep learning-based attribute upsampler.

FIG. 9 is a block diagram illustrating an example set of stages that may be included in a deep learning-based attribute upsampler, such as deep-learning based attribute upsampler 708 or point cloud upscaling unit 324. In this example, the set of stages includes deep learning layers 902, upsampling layer 910, and deep learning layers 920. Deep learning layers 902 initially process downscaled point cloud geometry and attribute information, providing results to upsampling layer 910. Upsampling layer 910 then upsamples the results of deep learning layers 902. Deep learning layers 920 then process the upsampled geometry and attribute information to produce reconstructed point cloud 930.

Figure 10:
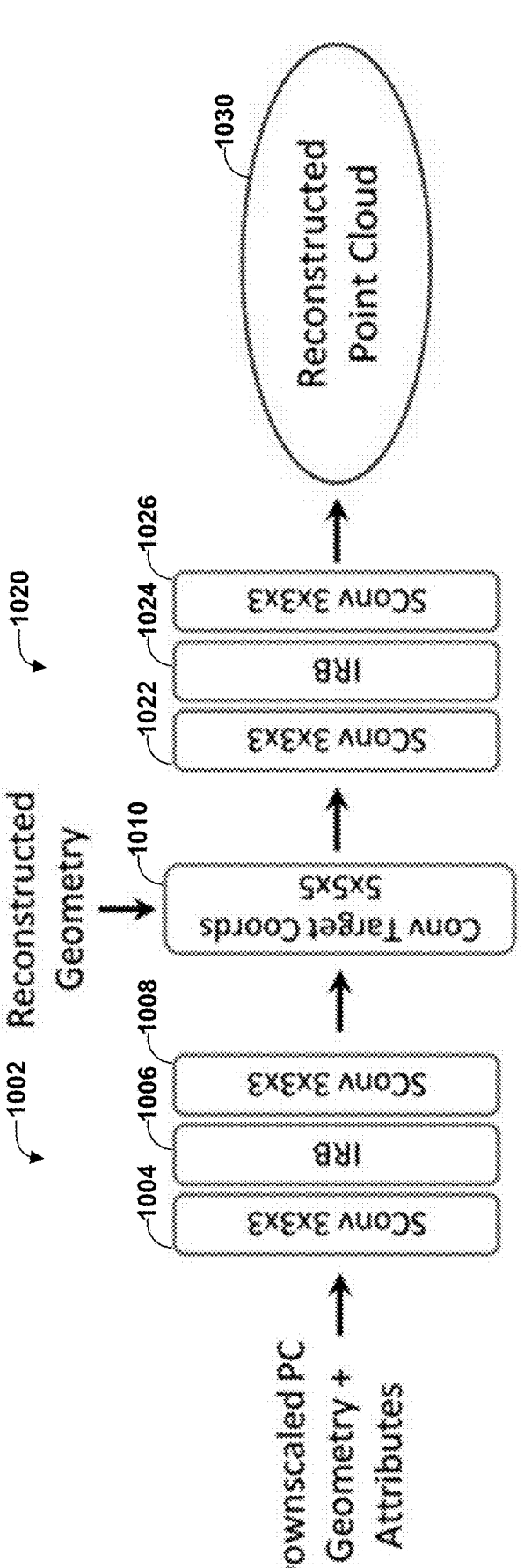
FIG. 10 is a block diagram illustrating another example set of stages that may be included in a deep learning-based attribute upsampler.

FIG. 10 is a block diagram illustrating an example set of stages that may be included in a deep learning-based attribute upsampler, such as deep-learning based attribute upsampler 708 or point cloud upscaling unit 324. In this example, the set of stages includes deep learning layers 1002 (which may correspond to deep learning layers 902), upsampling layer 1010 (which may correspond to upsampling layer 910), and deep learning layers 1020 (which may correspond to deep learning layers 920). In particular, deep learning layers 102 include sparse convolutional (SConv) 3×3×3 layer 1004, inception residual block (IRB) layer 1006, and SConv 3×3×3 layer 1008. In this example, upsampling layer 1010 is a convolution on target coordinates 5×5×5 layer. In this example, deep learning layers 1020 include SConv 3×3×3 layer 1022, IRB layer 1024, and SConv layer 1026. These layers process downscaled point cloud geometry and attributes in sequence to produce reconstructed point cloud 1030.

Sparse convolutional layers with a kernel size of 3×3×3 are used in FIG. 10 for purposes of example, but other deep learning-based layers may be used in addition or in the alternative. Likewise, while a convolution on target coordinates with a kernel size of 5×5×5 is used as one example, other upsampling techniques may be used in place of this layer. The convolution on target coordinates layer may be employed to map the features from the downscaled geometry to the upscaled geometry. If the downscaling/upsampling factor is large, multiple successive upsampling layers may be employed, or multiple successive attribute upsamplers may be used to upsample the attributes.

The attribute upsampler does not necessarily have to be deep learning-based. Where a fully convolutional network using sparse convolutions is shown in the example of FIG. 10, the same could be achieved using different deep learning-based layers. Similarly, for the upsampling layer, similar results could be achieved using other deep learning layers, such as transposed convolutions, deconvolutions, unpooling, or the like.

The attributes in the framework are not restricted to color information. For example, these techniques may be applied to code/upsample surface normals information, reflectance, intensity, or the like. Color space conversion may be applied to either individual modules or the whole framework. For example, YCbCr color space may be employed during recoloring, by the attribute encoder, the attribute decoder, and/or deep learning-based attribute upsampler. Point cloud encoder 200 may encode syntax elements representing color spaces associated with individual modules or the whole framework in the bitstream, and likewise, point cloud decoder 300 may decode and use the syntax elements to determine which color spaces should be used in which modules.

Point cloud encoder 200 and point cloud decoder 309 may code a downscaling factor in order for point cloud decoder 300 to determine how much adaptive geometry downscaling is to be performed and how much attribute upsampling to perform. If no downscaling is performed at point cloud encoder 200, then there is no need for upscaling at the decoder and the architecture shown in FIGS. 3 and 4 can be employed. This downscaling factor can be signaled in a parameter set, a slice, or other syntax structure in the bitstream, for example, in the sequence parameter set (SPS) or the attribute parameter set (APS). Although referred to as a downsampling factor (from the encoder perspective), point cloud decoder 300 may use this factor for other operations, including upsampling. In some examples, two downscaling factors may be signaled in the bitstream: one for geometry and one for attributes. In some examples, one downsampling factor may be signaled that applies to both the geometry and to the attributes.

The attribute coding technique type employed to code the recolored attributes may be signaled to the decoder side for point cloud decoder 300 to reconstruct the attribute values. This coding method, for example, G-PCC's Region Adaptive Hierarchical Transform (RAHT), can be signaled in a parameter set, for example, the sequence parameter set (SPS) or attribute parameter set (APS) as an identifier. The part of the bitstream that carries the coded attribute bits may be, for example, a network abstraction layer unit (NALU).

A list of coding techniques may be specified. Each coding technique may provide a way to code the attributes of the point cloud (optionally, they may also code the geometry in a lossless manner). An index to this list may be signaled in the bitstream to indicate the coding technique used to code the attributes. This index may be signaled in a parameter set (e.g., APS, SPS) or in other HLS.

When deep learning mechanisms are used for recoloring or decoding, parameters/coefficients corresponding to recoloring or decoding may also be signaled in the bitstream.

According to techniques of this disclosure, a deep learning-based attribute upsampler may employ residual learning to reconstruct a better quality point cloud. An effective point cloud upsampler is not limited to point cloud compression, but may have a wide range of applications.

For example, there is increasing popularity of augmented reality (AR) and virtual reality (VR) experiences, and other extended reality (XR) experiences, such as mixed reality (MR). Thus, there is interest in capturing high resolution real-world point clouds. Loss of details and irregularities in point cloud geometry can occur during the capturing, processing, and compression pipeline. Level-of-Detail (LoD) in a point cloud refers to the density or resolution of points captured or represented in a 3D data set and can impact the accuracy, precision, and usability of the point cloud for various applications. Upsampling a low Level-of-Detail (LoD) point cloud into a high LoD point cloud may provide various advantages. Often, upsampling, denoising, and filtering on the point cloud may be performed as a post processing technique to improve the quality of the point cloud.

According to techniques of this disclosure, a deep learning-based residual learning network may be used when post processing a point cloud (e.g., to upscale decoded attribute data). The deep learning-based residual learning network may be trained to upsample attribute data of point cloud data. For example, the deep learning-based residual learning network may, during training, receive both original, full scale attribute data, as well as downscaled attribute data, attempt to upsample the downscaled attribute data, and update the network model based on resulting differences between the upsampled attribute data and the original, full scale attribute data. In heuristic testing, residual learning networks outperform non-residual learning networks for tasks such as denoising, upsampling, deblocking, and the like. Residual learning networks may be used for point cloud filters, post-processing, and/or pre-processing tasks. A residual learning network may act as a learnable filter/post processing element for point clouds.

Figure 11B:
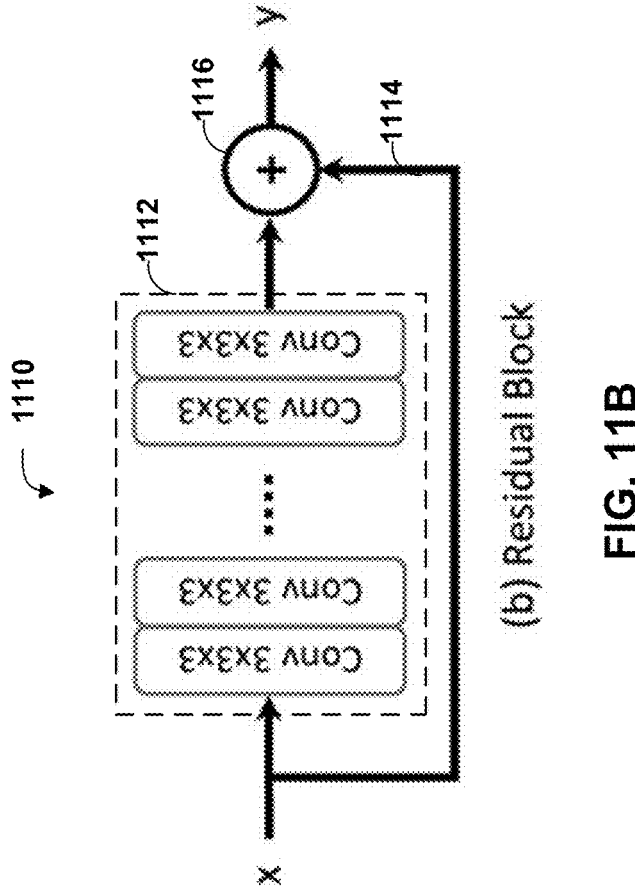
FIGS. 11A and 11B are conceptual diagrams illustrating examples of residual learning networks according to techniques of this disclosure.
Figure 11A:
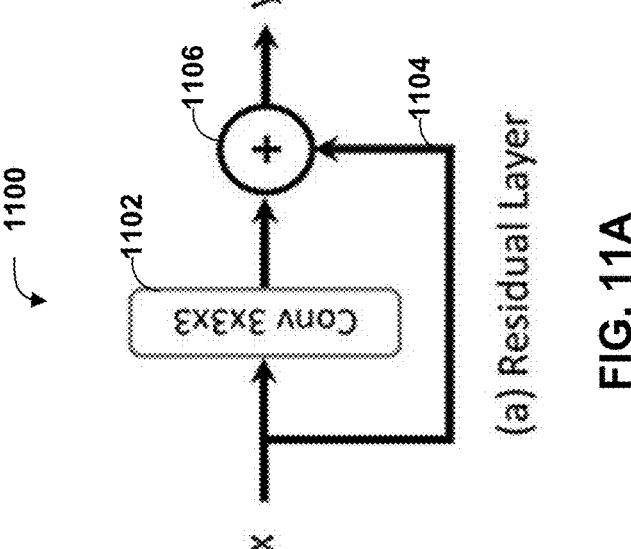

FIGS. 11A and 11B are conceptual diagrams illustrating examples of residual learning networks according to techniques of this disclosure. Residual networks include a neural network layer or a block of layers with a residual link. FIG. 11A for example, depicts residual learning network 1100 including convolutional 3×3×3 layer 1102, residual layer 1104, and combination unit 1106. FIG. 11B, as another example, depicts residual learning network 1110, which includes block of convolutional 3×3×3 layers 1112, residual block 1114, and combination unit 1116.

Neural networks act as stacked nonlinear layers that fit a mapping. Rather than learning the underlying mapping O(x), a residual network learns the mapping R(x)=O(x)−x. Where the original output mapping is recast into R(x)+x. This is shown in FIGS. 11A and 11B, where rather than directly learning the output mapping y, the network learns a mapping for the residual, which when added by combination units 1106, 1116 to the input x, gives output y. This is achieved by having a residual/shortcut link between the input and the output of the layer/layers.

Figure 12:
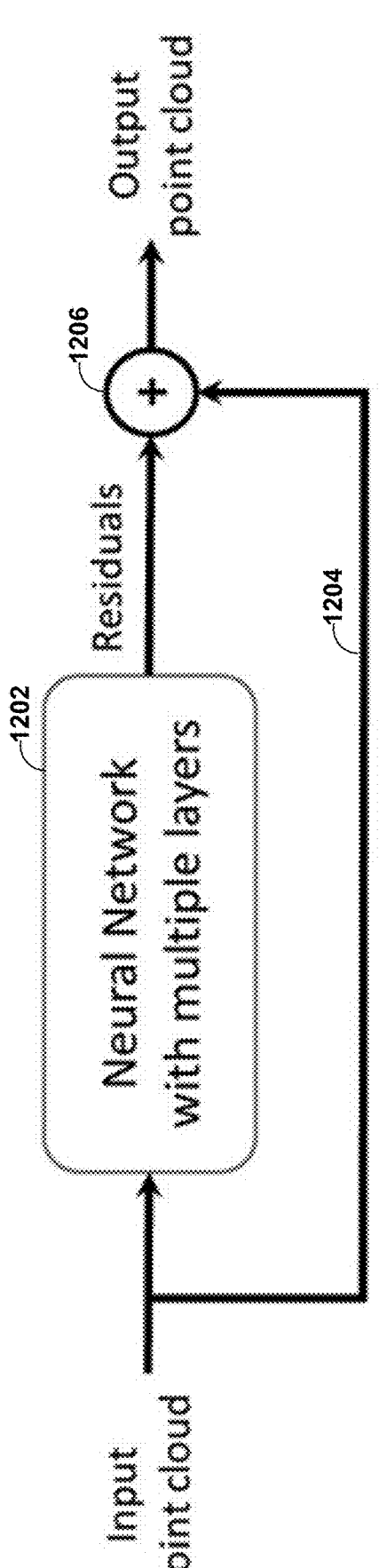
FIG. 12 is a conceptual diagram illustrating an example of a residual learning network for point clouds according to techniques of this disclosure.

FIG. 12 is a conceptual diagram illustrating an example of residual learning network 1200 for point clouds according to techniques of this disclosure. According to techniques of this disclosure, residual networks similar to those employed in image processing tasks may be applied to form an end-to-end residual network for point cloud processing tasks. FIG. 12 depicts an example residual learning network 1200. Rather than directly learning the mapping of the output point cloud, residual learning network 1200 learns the residual of the point clouds 1202 which, when added to the input point cloud 1204 by combination unit 1206, yield the desired output point cloud. Residual learning network 1200 may be employed as a post-processing/filter for point cloud processing.

Figure 13:
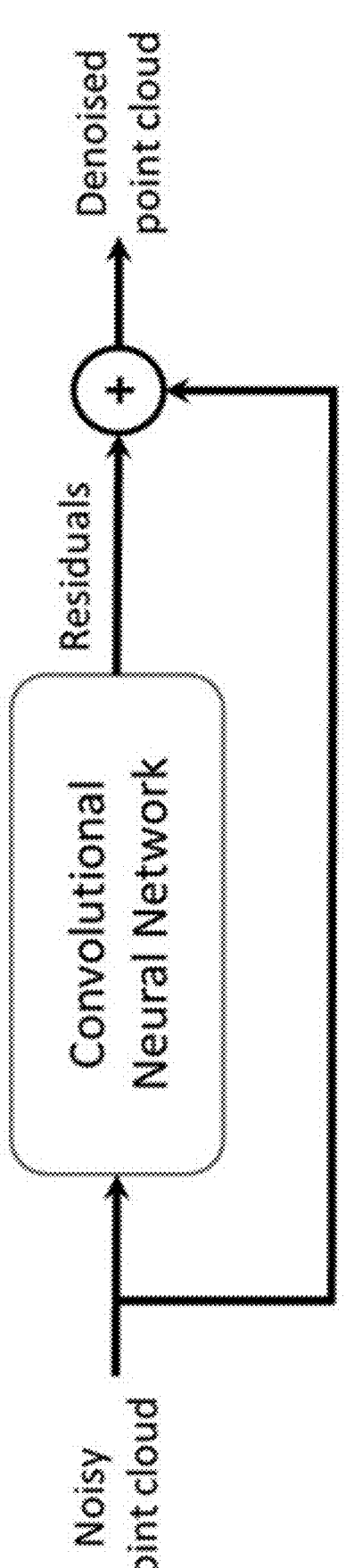
FIG. 13 is a conceptual diagram illustrating an example of a residual learning network employing a network as filter to denoise point clouds according to techniques of this disclosure.

FIG. 13 is a conceptual diagram illustrating an example of residual learning network 1300 employing a network as a filter to denoise point clouds according to techniques of this disclosure. In this example, residual learning network 1300 is applied to perform attribute denoising. In this example, where the input point cloud is noisy and residual learning network 1300 learns the residual noise, which when removed from the input point cloud, yields the denoised point cloud.

Figure 14:
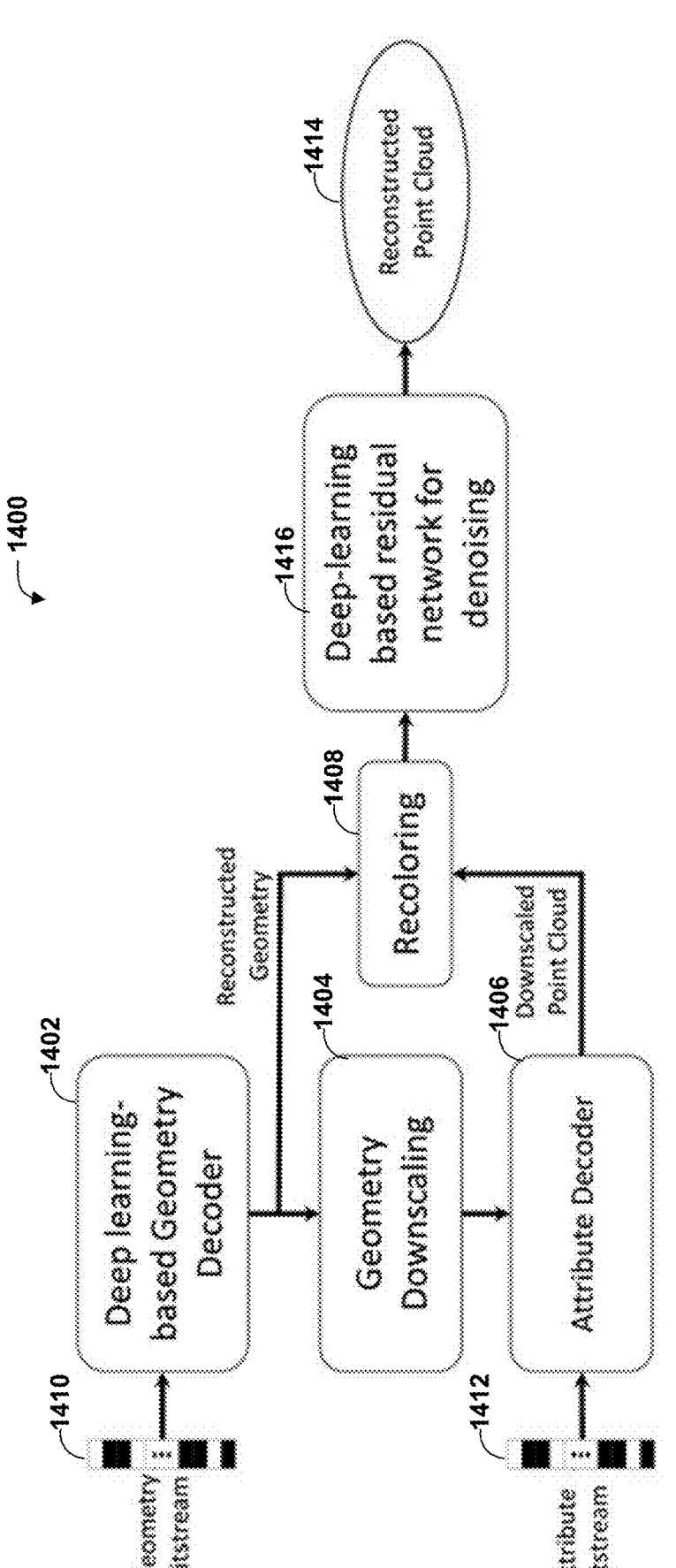
FIG. 14 is a conceptual diagram illustrating an example decoding framework according to techniques of this disclosure.

FIG. 14 is a conceptual diagram illustrating an example decoding framework according to techniques of this disclosure. In this example, point cloud decoding framework 1400 includes deep learning-based geometry decoder 1402, geometry downscaling unit 1404, attribute decoder 1406, recoloring unit 1408, and deep-learning based residual network for denoising 1416. Deep learning-based geometry decoder 1402 may correspond to deep learning-based geometry decoder 302, geometry downscaling unit 1404 may correspond to geometry downscaling unit 306, attribute decoder 1406 may correspond to attribute arithmetic decoding unit 304, inverse quantization unit 308, RAHT unit 314, LOD generation unit 316, inverse lifting unit 318, and inverse transform color unit 322, recoloring unit 1408, and deep-learning based residual network for denoising 1416 may correspond to point cloud upscaling unit 324.

In general, deep learning-based geometry decoder 1402 receives geometry bitstream 1410. Deep learning-based geometry decoder 1402 decodes geometry information of geometry bitstream 1410 and reconstructs geometry information from the decoded geometry information. Geometry downscaling unit 1404 downscales the geometry information to form downscaled geometry information and provides the downscaled geometry information to attribute decoder 1406. Attribute decoder 1406 receives attribute bitstream 1412, including encoded attribute information, and decodes the encoded attribute information. Attribute decoder 1406 may provide the decoded attribute information to recoloring unit 1408, which may also receive the original reconstructed geometry information, and apply the attribute information at the scale of the reconstructed geometry information. Deep-learning based residual network for denoising 1416 may denoise the output of recoloring unit 1408 to ultimately form reconstructed point cloud 1414.

In this manner, point cloud decoding framework 1400 performs a two-step upsampling process, as opposed to the single-step upsampling process performed by point cloud decoding framework 700 of FIG. 7. Even point cloud decoding framework 1400 does not explicitly performing upsampling, the recoloring step upsamples the attributes and maps them to the upsampled geometry. Recoloring unit 1408 passes the downscaled attributes through a recoloring scheme to recolor the reconstructed geometry with the downscaled attributes. This produces a noisy reconstructed point cloud that would have noise introduced due to recoloring, downscaling, and the encoding process. Deep-learning based residual network for denoising 1416 post-processes this point cloud, where deep-learning based residual network for denoising 1416 acts as a filter to denoise the point cloud.

Geometry downscaling at both the encoder as well as the decoder may have a certain downscaling ratio/rate (e.g., 2, 4, 8, etc.) The downscaling ratio/rate may be signaled from the encoder to the decoder, e.g., in an APS or an SPS, as discussed above. The decoder may include a single deep learning-based residual network for all downscaling ratios or multiple different deep learning-based residual networks for the various downscaling ratios/rates, where each residual network may be employed for a separate downscaling ratio.

In some examples, a deep learning-based residual network may be applied at other points of the coding pipeline. For example, in addition to or in the alternative to post processing attribute data, residual learning networks may be applied to geometry (coordinate) data. Residual learning networks may be employed for attribute denoising, geometry denoising, point cloud upsampling, point cloud artifact removal, classification, segmentation, and/or compression, or the like. Thus, residual learning networks may be used as a filter, post-processing unit, pre-processing unit, or any other task in the point cloud processing pipeline, e.g., point cloud capture, compression, and/or transmission. Residual learning networks may be employed with any attributes (e.g., RGB and/or intensity) or even a color space conversion to YCbCr attributes.

Figure 15:
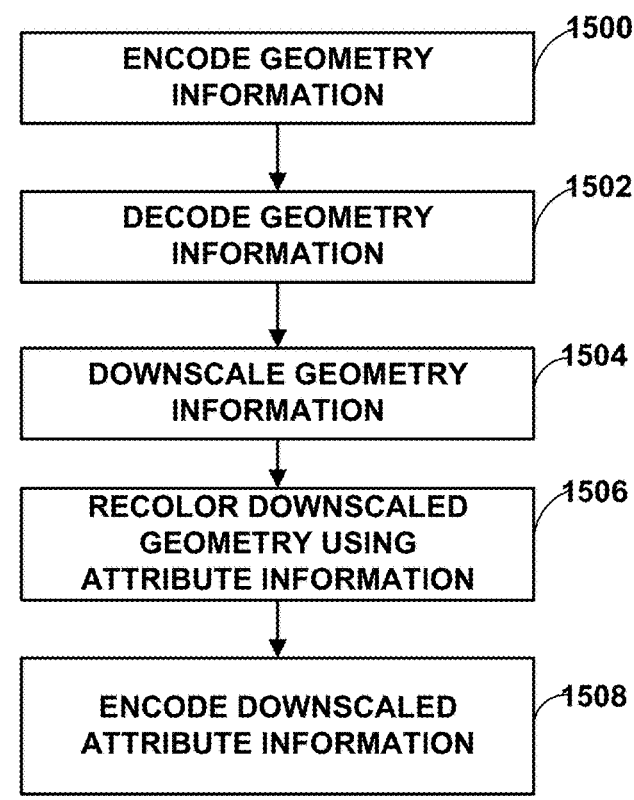
FIG. 15 is a flowchart illustrating an example method of encoding point cloud data according to the techniques of this disclosure.

FIG. 15 is a flowchart illustrating an example method of encoding point cloud data according to the techniques of this disclosure. The method of FIG. 15 is explained with respect to point cloud encoder 200 of FIG. 2. Other point cloud encoding devices, such as those conforming to point cloud encoding framework 600 of FIG. 6, may perform this or a similar method.

Initially, point cloud encoder 200 encodes geometry information of a point cloud (1500). For example, point cloud encoder 200 may use a deep learning-based point cloud encoding technique to encode the geometry information. Point cloud encoder 200 may then decode and reconstruct the geometry information (1502). Point cloud encoder 200 may also downscale the geometry information (1504). Point cloud encoder 200 may recolor the downscaled geometry information using the attribute information of the point cloud (1506). Point cloud encoder 200 may then encode the downscaled attribute information (1508). In some examples, point cloud encoder 200 may further encode HLS information specifying, for example, a downscaling factor for the geometry information and/or an upsampling factor for the attribute information.

In this manner, the method of FIG. 15 represents an example of a method for coding point cloud information, including: decoding encoded point cloud geometry data for a point cloud to reconstruct point cloud geometry data for the point cloud; downscaling the point cloud geometry data to form downscaled point cloud geometry data; and coding attribute data for the point cloud using the downscaled point cloud geometry.

Figure 16:
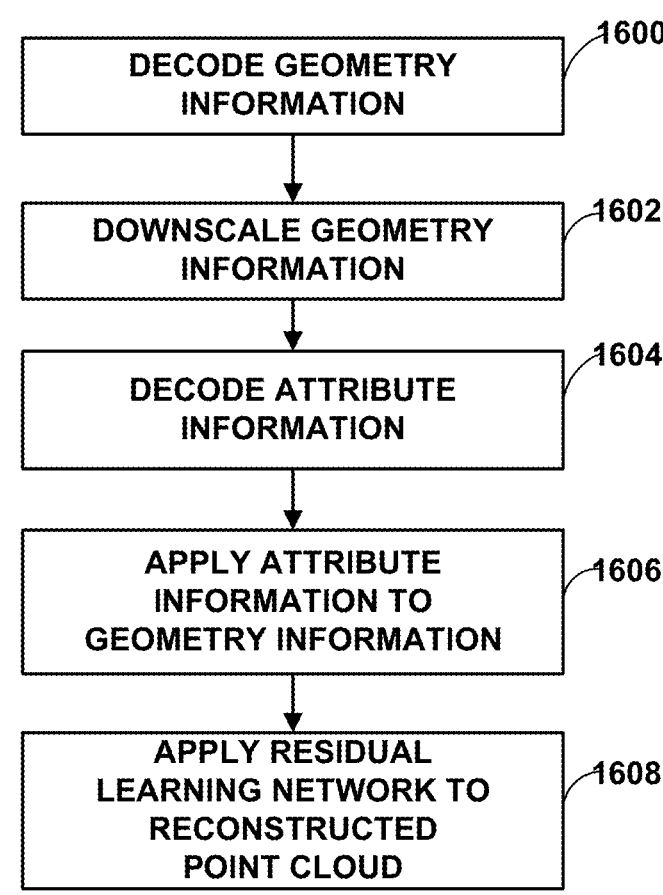
FIG. 16 is a flowchart illustrating an example method of decoding point cloud data according to the techniques of this disclosure.

FIG. 16 is a flowchart illustrating an example method of decoding point cloud data according to the techniques of this disclosure. The method of FIG. 16 is explained with respect to point cloud decoder 300 of FIG. 3. Other point cloud decoding devices, such as those conforming to point cloud decoding framework 700 of FIG. 7, may perform this or a similar method.

Initially, point cloud decoder 300 decodes geometry information (1600). Point cloud decoder 300 may also decode a downscaling factor, e.g., in high level syntax (HLS) data. Point cloud decoder 300 may downscale the geometry information (1602), e.g., according to the downscaling factor. Point cloud decoder 300 may then decode attribute information (1604). Point cloud decoder 300 may then apply the attribute information to the decoded geometry information (1606), which may result in an intermediate (noisy) point cloud. Point cloud decoder 300 may then apply a residual learning network to the intermediate point cloud (1608) to form a reconstructed point cloud. For example, the residual learning network may correspond to, e.g., SConv 3×3×3 layer 1022, IRB layer 1024, and SConv layer 1026 of FIG. 10; residual learning network 1100 of FIG. 11A; residual learning network 1110 of FIG. 11B; residual learning network 1200 of FIG. 12; residual learning network 1300 of FIG. 13; or deep-learning based residual learning network 1416 of FIG. 14.

In this manner, the method of FIG. 16 represents an example of a method for coding (e.g., encoding or decoding) point cloud information, including: decoding encoded point cloud geometry data for a point cloud to form reconstructed point cloud geometry data for the point cloud; downscaling the point cloud geometry data to form downscaled point cloud geometry data; decoding attribute data for the point cloud using the downscaled point cloud geometry; applying the attribute data to the reconstructed point cloud geometry data to form intermediate point cloud data; and applying a residual learning network to the intermediate point cloud data to form a reconstructed point cloud.

Figure 17:
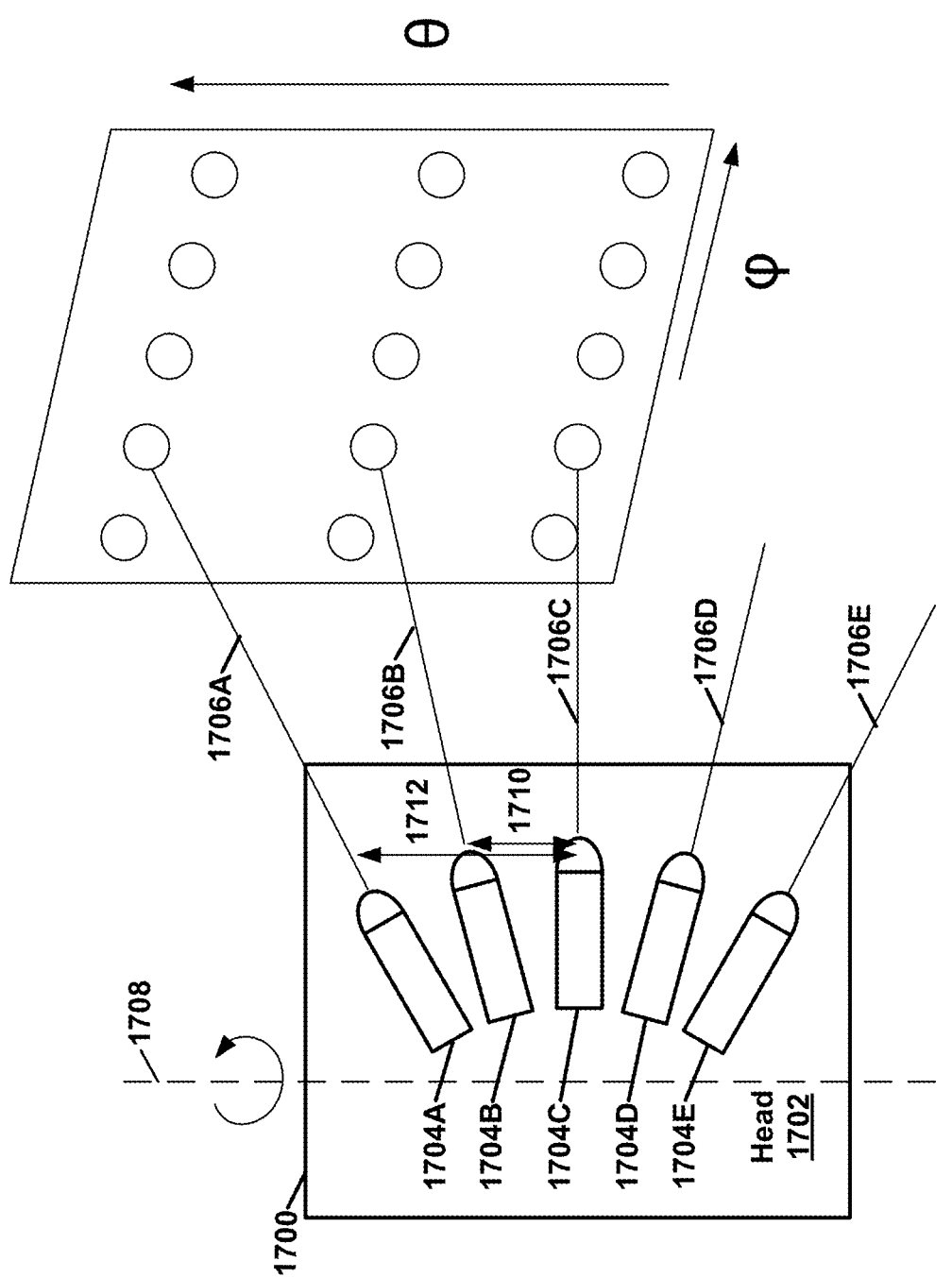
FIG. 17 is a conceptual diagram illustrating a laser package, such as a LIDAR sensor or other system that includes one or more lasers, scanning points in 3-dimensional space.

FIG. 17 is a conceptual diagram illustrating a laser package 1700, such as a LIDAR sensor or other system that includes one or more lasers, scanning points in 3-dimensional space. Data source 104 (FIG. 1) may include laser package 1700.

As shown in FIG. 17, point clouds can be captured using laser package 1700, i.e., the sensor scans the points in 3D space. It is to be understood, however, that some point clouds are not generated by an actual LIDAR sensor but may be encoded as if they were. In the example of FIG. 17, laser package 1700 includes a LIDAR head 1702 that includes multiple lasers 1704A-1704E (collectively, "lasers 1704") arrayed in a vertical plane at different angles relative to an origin point. Laser package 1700 may rotate around a vertical axis 1708. Laser package 1700 may use returned laser light to determine the distances and positions of points of the point cloud. Laser beams 1706A-1306E (collectively, "laser beams 1706") emitted by lasers 1704 of laser package 1700 may be characterized by a set of parameters. Distances denoted by arrows 1710, 1712 denotes an example laser correction values for laser 1704B, 1704A, respective.

Lasers 1700 may be used to obtain both geometry data and attribute data for points of the geometry data. The point cloud geometry data may be downscaled, and the attribute data may be downscaled and coded. Per the techniques of this disclosure, the attribute data may subsequently be upscaled using a residual learning network.

Figure 18:
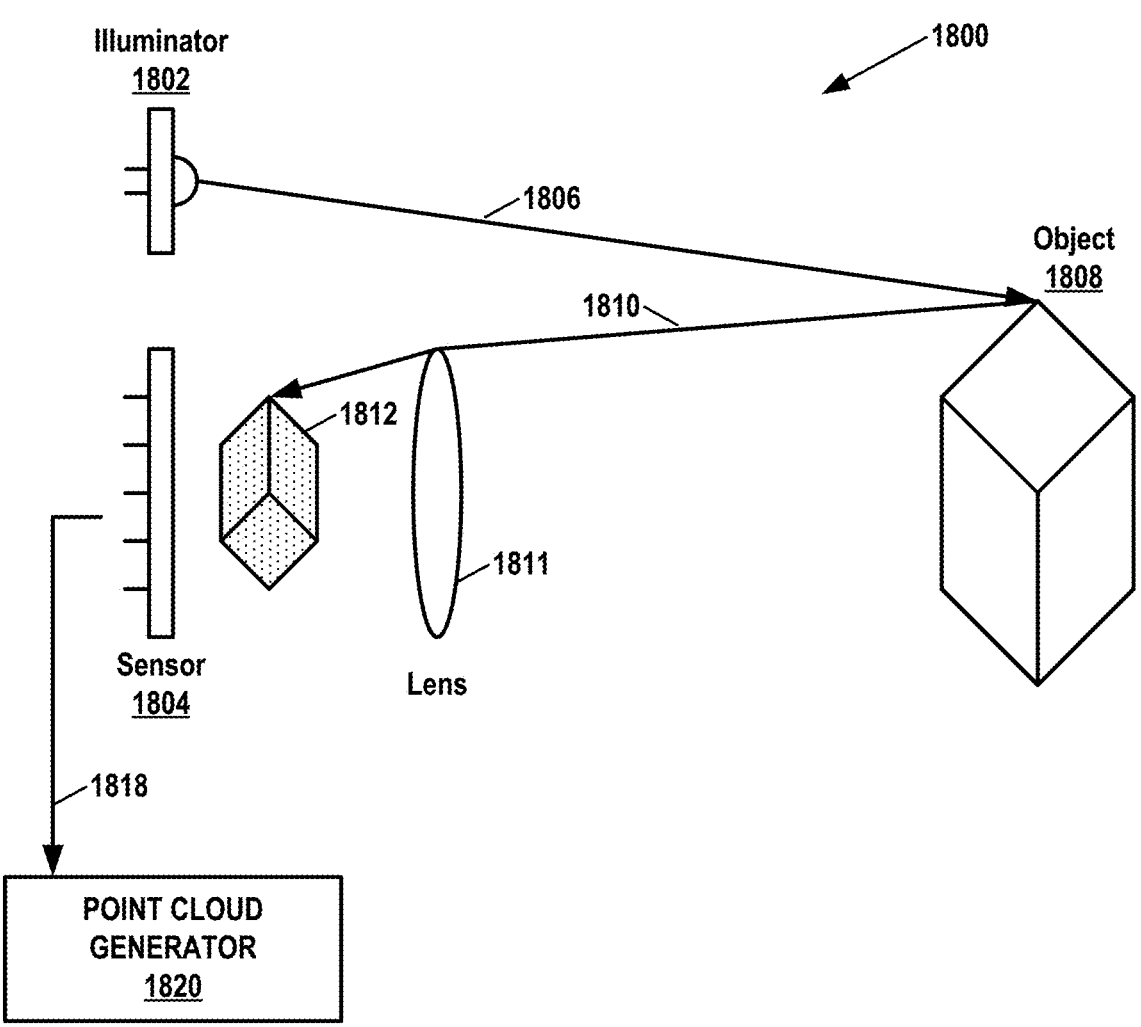
FIG. 18 is a conceptual diagram illustrating an example range-finding system 900 that may be used with one or more techniques of this disclosure.

FIG. 18 is a conceptual diagram illustrating an example range-finding system 1800 that may be used with one or more techniques of this disclosure. In the example of FIG. 18, range-finding system 1800 includes an illuminator 1802 and a sensor 1804. Illuminator 1802 may emit light 1806. In some examples, illuminator 1802 may emit light 1806 as one or more laser beams. Light 1806 may be in one or more wavelengths, such as an infrared wavelength or a visible light wavelength. In other examples, light 1806 is not coherent, laser light. When light 1806 encounters an object, such as object 1808, light 1806 creates returning light 1810. Returning light 1810 may include backscattered and/or reflected light. Returning light 1810 may pass through a lens 1811 that directs returning light 1810 to create an image 1812 of object 1808 on sensor 1804. Sensor 1804 generates signals 1814 based on image 1812. Image 1812 may comprise a set of points (e.g., as represented by dots in image 1812 of FIG. 18).

In some examples, illuminator 1802 and sensor 1804 may be mounted on a spinning structure so that illuminator 1802 and sensor 1804 capture a 360-degree view of an environment. In other examples, range-finding system 1800 may include one or more optical components (e.g., mirrors, collimators, diffraction gratings, etc.) that enable illuminator 1802 and sensor 1804 to detect objects within a specific range (e.g., up to 360-degrees). Although the example of FIG. 18 only shows a single illuminator 1802 and sensor 1804, range-finding system 1800 may include multiple sets of illuminators and sensors.

In some examples, illuminator 1802 generates a structured light pattern. In such examples, range-finding system 1800 may include multiple sensors 1804 upon which respective images of the structured light pattern are formed. Range-finding system 1800 may use disparities between the images of the structured light pattern to determine a distance to an object 1808 from which the structured light pattern backscatters. Structured light-based range-finding systems may have a high level of accuracy (e.g., accuracy in the sub-millimeter range), when object 1808 is relatively close to sensor 1804 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 1800 is a time of flight (ToF)-based system. In some examples where range-finding system 1800 is a ToF-based system, illuminator 1802 generates pulses of light. In other words, illuminator 1802 may modulate the amplitude of emitted light 1806. In such examples, sensor 1804 detects returning light 1810 from the pulses of light 1806 generated by illuminator 1802. Range-finding system 1800 may then determine a distance to object 1808 from which light 1806 backscatters based on a delay between when light 1806 was emitted and detected and the known speed of light in air). In some examples, rather than (or in addition to) modulating the amplitude of the emitted light 1806, illuminator 1802 may modulate the phase of the emitted light 1806. In such examples, sensor 1804 may detect the phase of returning light 1810 from object 1808 and determine distances to points on object 1808 using the speed of light and based on time differences between when illuminator 1802 generated light 1806 at a specific phase and when sensor 1804 detected returning light 1810 at the specific phase.

In other examples, a point cloud may be generated without using illuminator 1802. For instance, in some examples, sensor 1804 of range-finding system 1800 may include two or more optical cameras. In such examples, range-finding system 1800 may use the optical cameras to capture stereo images of the environment, including object 1808. Range-finding system 1800 (e.g., point cloud generator 1820) may then calculate the disparities between locations in the stereo images. Range-finding system 1800 may then use the disparities to determine distances to the locations shown in the stereo images. From these distances, point cloud generator 1820 may generate a point cloud.

Sensors 1804 may also detect other attributes of object 1808, such as color and reflectance information. In the example of FIG. 18, a point cloud generator 1820 may generate a point cloud based on signals 1818 generated by sensor 1804. Range-finding system 1800 and/or point cloud generator 1820 may form part of data source 104 (FIG. 1).

Figure 19:
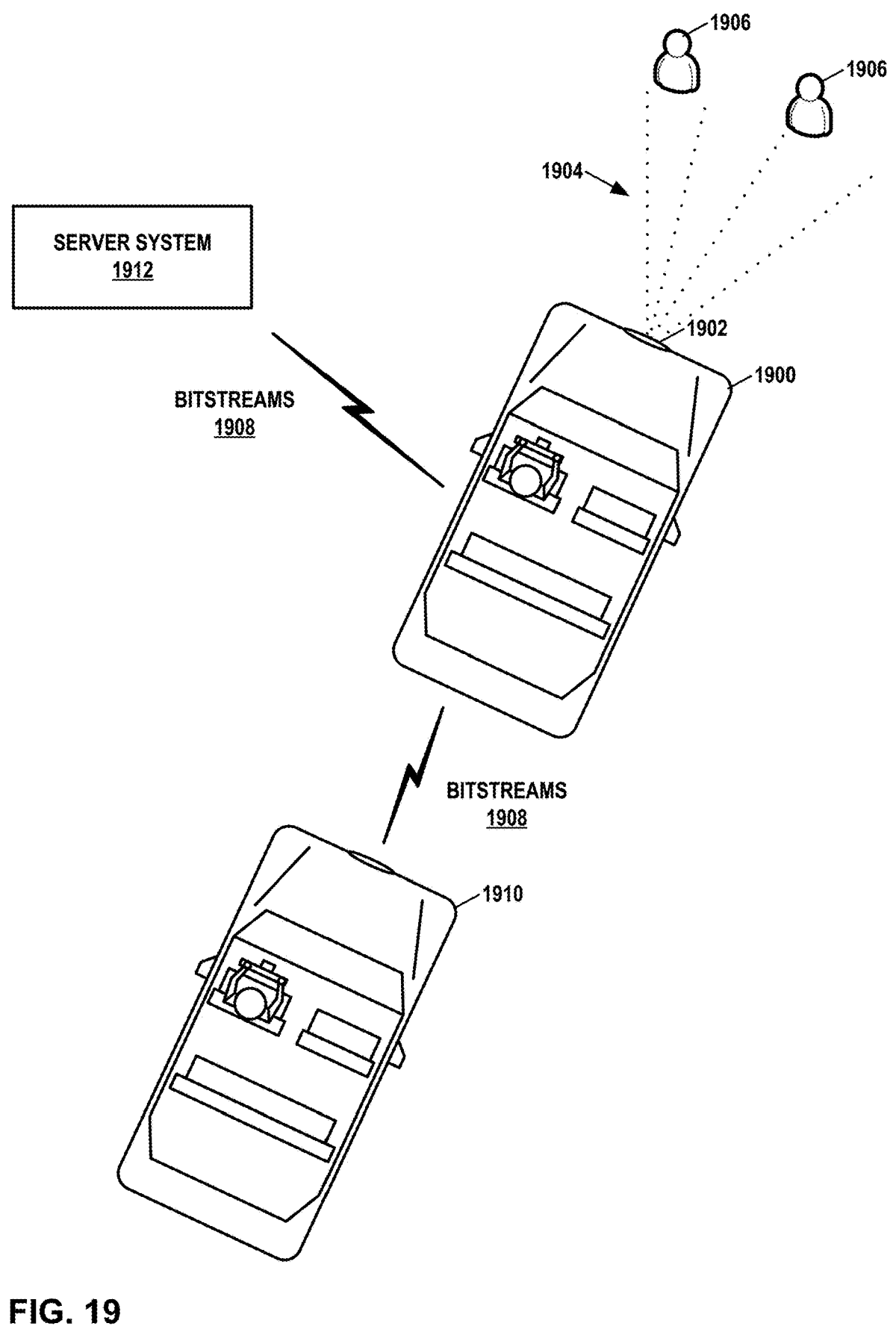

FIG. 19 is a conceptual diagram illustrating an example vehicle-based scenario in which one or more techniques of this disclosure may be used. In the example of FIG. 19, a vehicle 1900 includes a laser package 1902, such as a LIDAR system. Laser package 1902 may be implemented in the same manner as laser package 600 (FIG. 17). Although not shown in the example of FIG. 19, vehicle 1900 may also include a data source, such as data source 104 (FIG. 1), and a G-PCC encoder, such as G-PCC encoder 200 (FIG. 1). In the example of FIG. 19, laser package 1902 emits laser beams 1904 that reflect off pedestrians 1906 or other objects in a roadway. The data source of vehicle 1900 may generate a point cloud based on signals generated by laser package 1902. The G-PCC encoder of vehicle 1900 may encode the point cloud to generate bitstreams 1908, such as the geometry bitstream of FIG. 2 and the attribute bitstream of FIG. 2. Bitstreams 1908 may include many fewer bits than the unencoded point cloud obtained by the G-PCC encoder. An output interface of vehicle 1900 (e.g., output interface 108 (FIG. 1) may transmit bitstreams 1908 to one or more other devices. Thus, vehicle 1900 may be able to transmit bitstreams 1908 to other devices more quickly than the unencoded point cloud data. Additionally, bitstreams 1908 may require less data storage capacity.

The techniques of this disclosure may further reduce the number of bits in bitstreams 1908. For instance, by downscaling and then coding the attribute data, the amount of attribute data to be encoded may be significantly reduced, thereby reducing the number of bits in bitstream 1908. By subsequently upscaling the downscaled attribute data using a residual learning network, the reconstructed point cloud based on the upscaled attribute data may nevertheless maintain a high degree of accuracy compared to the original point cloud.

In the example of FIG. 19, vehicle 1900 may transmit bitstreams 1908 to another vehicle 1910. Vehicle 1910 may include a G-PCC decoder, such as G-PCC decoder 300 (FIG. 1). The G-PCC decoder of vehicle 1910 may decode bitstreams 1908 to reconstruct the point cloud. Vehicle 1910 may use the reconstructed point cloud for various purposes. For instance, vehicle 1910 may determine based on the reconstructed point cloud that pedestrians 1906 are in the roadway ahead of vehicle 1900 and therefore start slowing down, e.g., even before a driver of vehicle 1910 realizes that pedestrians 1906 are in the roadway. Thus, in some examples, vehicle 1910 may perform an autonomous navigation operation, generate a notification or warning, or perform another action based on the reconstructed point cloud.

Additionally or alternatively, vehicle 1900 may transmit bitstreams 1908 to a Server system 1912. Server system 1912 may use bitstreams 1908 for various purposes. For example, server system 1912 may store bitstreams 1908 for subsequent reconstruction of the point clouds. In this example, server system 1912 may use the point clouds along with other data (e.g., vehicle telemetry data generated by vehicle 1900) to train an autonomous driving system. In other example, server system 1912 may store bitstreams 1908 for subsequent reconstruction for forensic crash investigations (e.g., if vehicle 1900 collides with pedestrians 1906).

Figure 20:
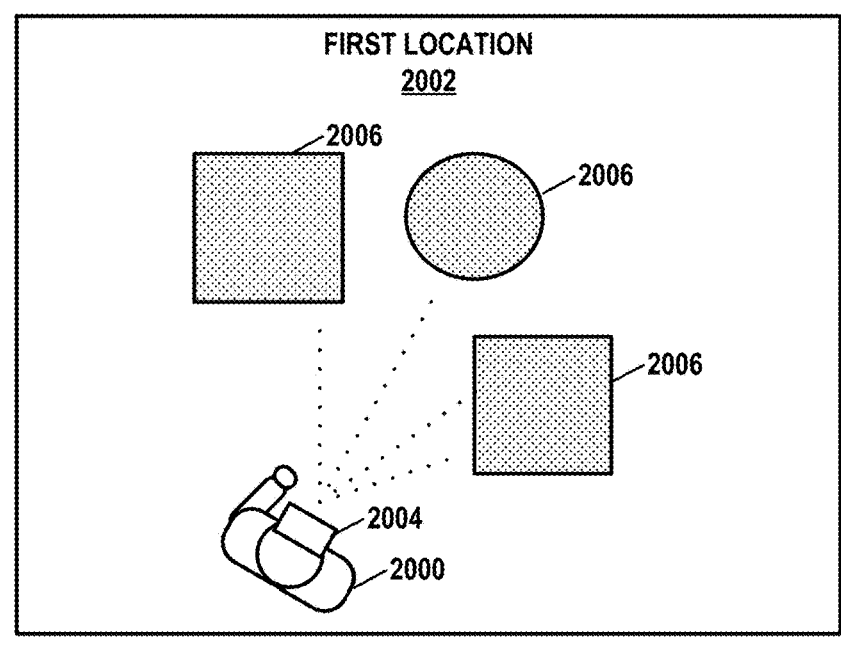
FIG. 20 is a conceptual diagram illustrating an example extended reality system in which one or more techniques of this disclosure may be used.
Figure 20:
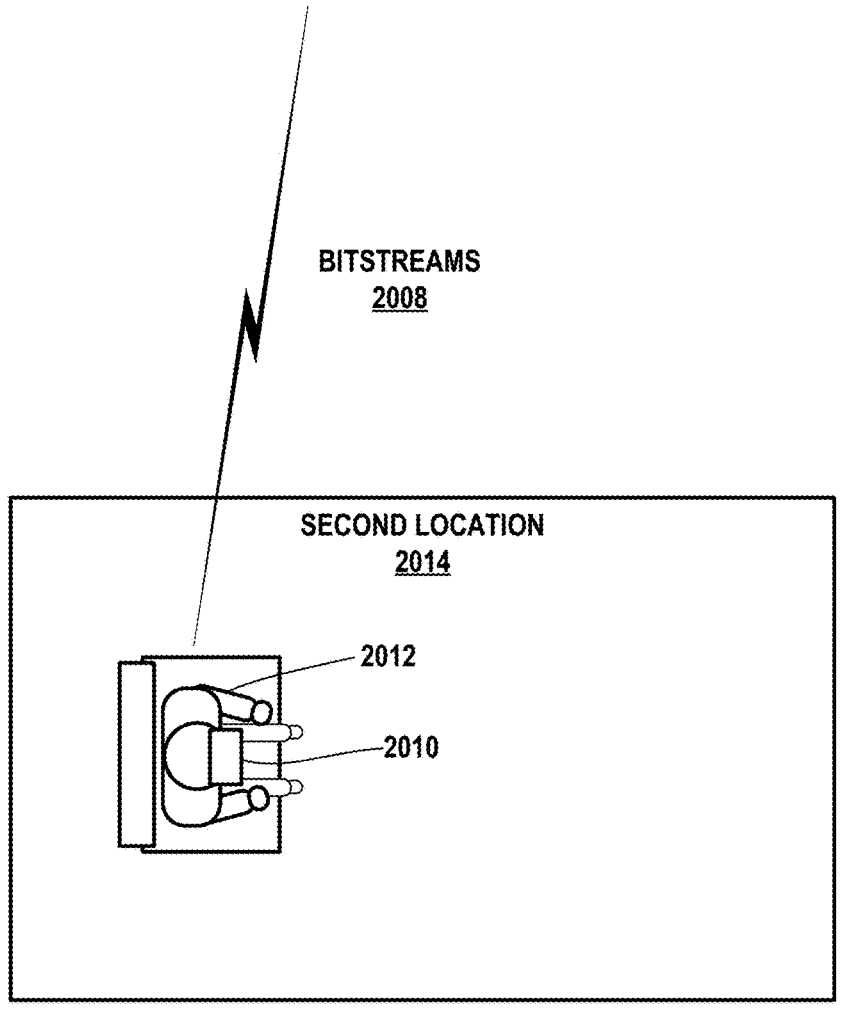

FIG. 20 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 20, a first user 2000 is located in a first location 2002. User 2000 wears an XR headset 2004. As an alternative to XR headset 2004, user 2000 may use a mobile device (e.g., mobile phone, tablet computer, etc.). XR headset 2004 includes a depth detection sensor, such as a LIDAR system, that detects positions of points on objects 2006 at location 2002. A data source of XR headset 2004 may use the signals generated by the depth detection sensor to generate a point cloud representation of objects 2006 at location 2002. XR headset 2004 may include a G-PCC encoder (e.g., G-PCC encoder 200 of FIG. 1) that is configured to encode the point cloud to generate bitstreams 2008.

The techniques of this disclosure may further reduce the number of bits in bitstreams 2008. For instance, by downscaling and then coding the attribute data, the amount of attribute data to be encoded may be significantly reduced, thereby reducing the number of bits in bitstream 2008. By subsequently upscaling the downscaled attribute data using a residual learning network, the reconstructed point cloud based on the upscaled attribute data may nevertheless maintain a high degree of accuracy compared to the original point cloud.

XR headset 2004 may transmit bitstreams 2008 (e.g., via a network such as the Internet) to an XR headset 2010 worn by a user 2012 at a second location 2014. XR headset 2010 may decode bitstreams 2008 to reconstruct the point cloud. XR headset 2010 may use the point cloud to generate an XR visualization (e.g., an AR, MR, VR visualization) representing objects 2006 at location 2002. Thus, in some examples, such as when XR headset 2010 generates a VR visualization, user 2012 at location 2014 may have a 3D immersive experience of location 2002. In some examples, XR headset 2010 may determine a position of a virtual object based on the reconstructed point cloud. For instance, XR headset 2010 may determine, based on the reconstructed point cloud, that an environment (e.g., location 2002) includes a flat surface and then determine that a virtual object (e.g., a cartoon character) is to be positioned on the flat surface. XR headset 2010 may generate an XR visualization in which the virtual object is at the determined position. For instance, XR headset 2010 may show the cartoon character sitting on the flat surface.

Figure 21:
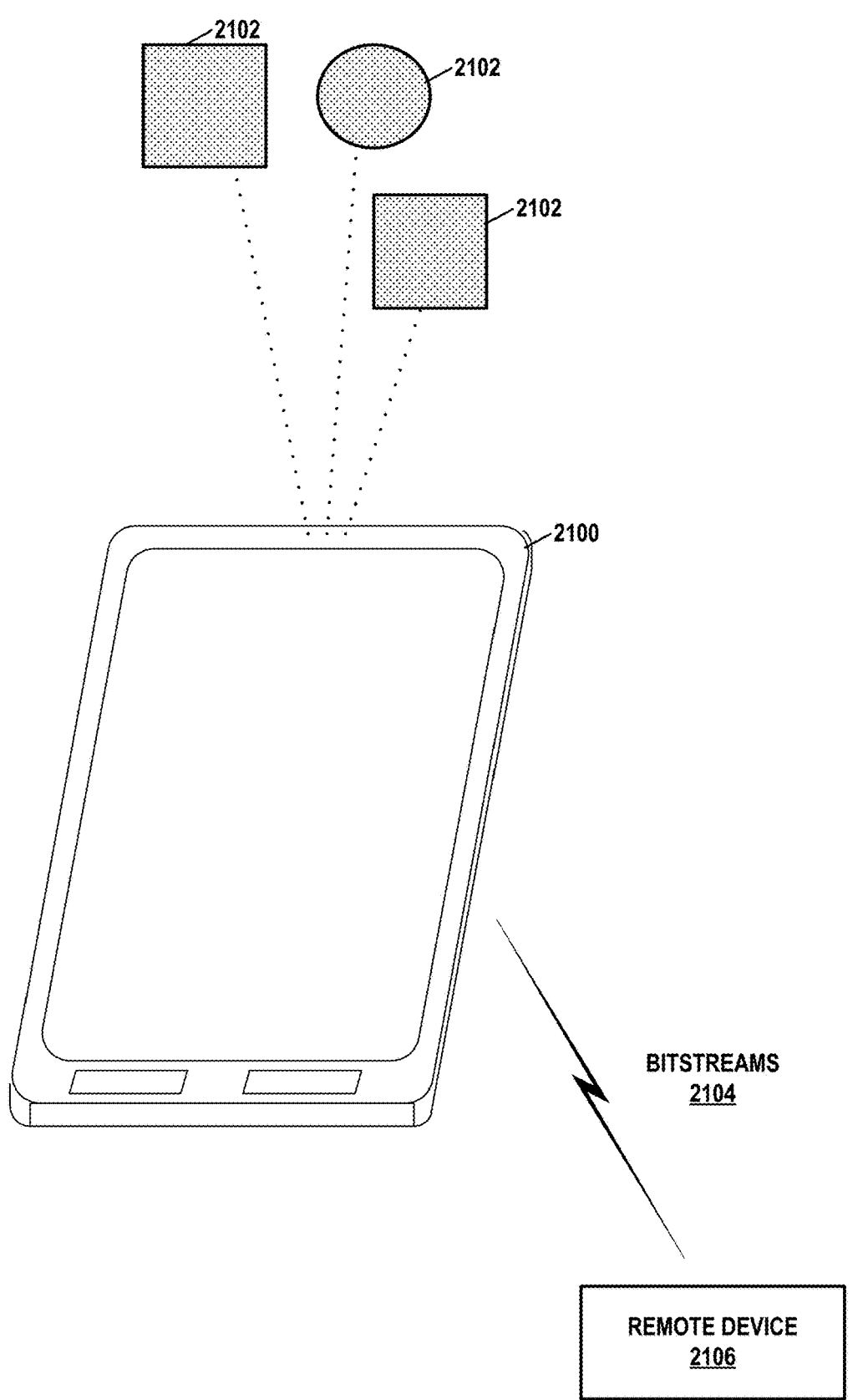
FIG. 21 is a conceptual diagram illustrating an example mobile device system in which one or more techniques of this disclosure may be used.

FIG. 21 is a conceptual diagram illustrating an example mobile device system in which one or more techniques of this disclosure may be used. In the example of FIG. 21, a mobile device 2100, such as a mobile phone or tablet computer, includes a depth detection sensor, such as a LIDAR system, that detects positions of points on objects 2102 in an environment of mobile device 2100. A data source of mobile device 2100 may use the signals generated by the depth detection sensor to generate a point cloud representation of objects 2102. Mobile device 2100 may include a G-PCC encoder (e.g., G-PCC encoder 200 of FIG. 1) that is configured to encode the point cloud to generate bitstreams 2104. In the example of FIG. 21, mobile device 2100 may transmit bitstreams to a remote device 2106, such as a server system or other mobile device. Remote device 2106 may decode bitstreams 2104 to reconstruct the point cloud. Remote device 2106 may use the point cloud for various purposes. For example, remote device 2106 may use the point cloud to generate a map of environment of mobile device 2100. For instance, remote device 2106 may generate a map of an interior of a building based on the reconstructed point cloud. In another example, remote device 2106 may generate imagery (e.g., computer graphics) based on the point cloud. For instance, remote device 2106 may use points of the point cloud as vertices of polygons and use color attributes of the points as the basis for shading the polygons. In some examples, remote device 2106 may perform facial recognition using the point cloud.

The following clauses represent various examples of the techniques of this disclosure.

Clause 1: A device for decoding point cloud data, the device comprising: a memory configured to store point cloud data; and one or more processors implemented in circuitry and configured to: decode encoded point cloud geometry data for a point cloud to form reconstructed point cloud geometry data for the point cloud; downscale the point cloud geometry data to form downscaled point cloud geometry data; decode attribute data for the point cloud using the downscaled point cloud geometry; apply the attribute data to the reconstructed point cloud geometry data to form intermediate point cloud data; and apply a residual learning network to the intermediate point cloud data to form a reconstructed point cloud.

Clause 2: The device of clause 1, wherein the one or more processors are further configured to decode a value representing an amount of downscaling to be applied to the point cloud geometry data, wherein to downscale the point cloud geometry data, the one or more processors are configured to downscale the point cloud geometry data according to the value representing the amount of downscaling.

Clause 3: The device of clause 2, wherein the one or more processors are configured to provide the value representing the amount of downscaling to be applied to the point cloud geometry data to the residual learning network.

Clause 4: The device of clause 2, wherein the one or more processors are configured to select the residual learning network from a plurality of residual learning networks according to the value representing the amount of downscaling to be applied to the point cloud geometry data.

Clause 5: The device of clause 1, wherein the residual learning network includes one or more convolutional neural network layers and a combination unit that combines output of the one or more convolutional neural network layers with the intermediate point cloud data to form the reconstructed point cloud.

Clause 6: The device of clause 1, wherein the residual learning network comprises a first residual learning network, and wherein the one or more processors are further configured to apply a second residual learning network during pre-processing or as a filter to the point cloud.

Clause 7: The device of clause 1, wherein the attribute data includes color data in one of a red-green-blue (RGB) format or a luminance, blue hue chrominance, and red hue chrominance (YCbCr) format.

Clause 8: The device of clause 1, wherein to downscale the point cloud geometry data, the one or more processors are configured to: for each node of an octree that includes eight leaf sub-nodes where at least one of the eight leaf sub-nodes is occupied by a point, redefine the node as an occupied leaf node in a downscaled octree; and for each node of the octree that includes eight leaf sub-nodes where none of the eight leaf sub-nodes is occupied by a point, redefine the node as an unoccupied leaf node in the downscaled octree.

Clause 9: The device of clause 1, wherein to downscale the point cloud geometry data, the one or more processors are configured to: for each node of an octree that includes eight leaf sub-nodes where a number of the eight leaf sub-nodes that is occupied is greater than a threshold, redefine the node as an occupied leaf node in a downscaled octree; and for each node of the octree that includes eight leaf sub-nodes where a number of the eight leaf sub-nodes that is occupied is less than or equal to the threshold, redefine the node as an unoccupied leaf node in the downscaled octree.

Clause 10: The device of clause 1, wherein the one or more processors are further configured to decode a value representing an amount of downscaling to be applied to the point cloud geometry data, wherein to downscale the point cloud geometry data, the one or more processors are configured to downscale the point cloud geometry data according to the value representing the amount of downscaling.

Clause 11: The device of clause 10, wherein the one or more processors are configured to provide the value representing the amount of downscaling to be applied to the point cloud geometry data to the residual learning network.

Clause 12: The device of clause 10, wherein the one or more processors are configured to select the residual learning network from a plurality of residual learning networks according to the value representing the amount of downscaling to be applied to the point cloud geometry data.

Clause 13: The device of any of clauses 1 and 10-12, wherein the residual learning network includes one or more convolutional neural network layers and a combination unit that combines output of the one or more convolutional neural network layers with the intermediate point cloud data to form the reconstructed point cloud.

Clause 14: The device of any of clauses 1 and 10-13, wherein the residual learning network comprises a first residual learning network, and wherein the one or more processors are further configured to apply a second residual learning network during pre-processing or as a filter to the point cloud.

Clause 15: The device of any of clauses 1 and 10-14, wherein the attribute data includes color data in one of a red-green-blue (RGB) format or a luminance, blue hue chrominance, and red hue chrominance (YCbCr) format.

Clause 16: The device of any of clauses 1 and 10-15, wherein to downscale the point cloud geometry data, the one or more processors are configured to: for each node of an octree that includes eight leaf sub-nodes where at least one of the eight leaf sub-nodes is occupied by a point, redefine the node as an occupied leaf node in a downscaled octree; and for each node of the octree that includes eight leaf sub-nodes where none of the eight leaf sub-nodes is occupied by a point, redefine the node as an unoccupied leaf node in the downscaled octree.

Clause 17: The device of any of clauses 1 and 10-15, wherein to downscale the point cloud geometry data, the one or more processors are configured to: for each node of an octree that includes eight leaf sub-nodes where a number of the eight leaf sub-nodes that is occupied is greater than a threshold, redefine the node as an occupied leaf node in a downscaled octree; and for each node of the octree that includes eight leaf sub-nodes where a number of the eight leaf sub-nodes that is occupied is less than or equal to the threshold, redefine the node as an unoccupied leaf node in the downscaled octree.

Clause 18: A method of decoding point cloud data, the method comprising: decoding encoded point cloud geometry data for a point cloud to form reconstructed point cloud geometry data for the point cloud; downscaling the point cloud geometry data to form downscaled point cloud geometry data; decoding attribute data for the point cloud using the downscaled point cloud geometry; applying the attribute data to the reconstructed point cloud geometry data to form intermediate point cloud data; and applying a residual learning network to the intermediate point cloud data to form a reconstructed point cloud.

Clause 19: The method of clause 18, further comprising decoding a value representing an amount of downscaling to be applied to the point cloud geometry data, wherein downscaling the point cloud geometry data includes downscaling the point cloud geometry data according to the value representing the amount of downscaling.

Clause 20: The method of clause 19, further comprising providing the value representing the amount of downscaling to be applied to the point cloud geometry data to the residual learning network.

Clause 21: The method of clause 19, further comprising selecting the residual learning network from a plurality of residual learning networks according to the value representing the amount of downscaling to be applied to the point cloud geometry data.

Clause 22: The method of clause 18, wherein the residual learning network includes one or more convolutional neural network layers and a combination unit that combines output of the one or more convolutional neural network layers with the intermediate point cloud data to form the reconstructed point cloud.

Clause 23: The method of clause 18, wherein the residual learning network comprises a first residual learning network, the method further comprising applying a second residual learning network during pre-processing or as a filter to the point cloud.

Clause 24: The method of clause 18, wherein the attribute data includes color data in one of a red-green-blue (RGB) format or a luminance, blue hue chrominance, and red hue chrominance (YCbCr) format.

Clause 25: The method of clause 18, wherein downscaling the point cloud geometry data comprises: for each node of an octree that includes eight leaf sub-nodes where at least one of the eight leaf sub-nodes is occupied by a point, redefining the node as an occupied leaf node in a downscaled octree; and for each node of the octree that includes eight leaf sub-nodes where none of the eight leaf sub-nodes is occupied by a point, redefining the node as an unoccupied leaf node in the downscaled octree.

Clause 26: The method of clause 18, wherein downscaling the point cloud geometry data comprises: for each node of an octree that includes eight leaf sub-nodes where a number of the eight leaf sub-nodes that is occupied is greater than a threshold, redefining the node as an occupied leaf node in a downscaled octree; and for each node of the octree that includes eight leaf sub-nodes where a number of the eight leaf sub-nodes that is occupied is less than or equal to the threshold, redefining the node as an unoccupied leaf node in the downscaled octree.

Clause 27: The method of clause 18, further comprising decoding a value representing an amount of downscaling to be applied to the point cloud geometry data, wherein downscaling the point cloud geometry data comprises downscaling the point cloud geometry data according to the value representing the amount of downscaling.

Clause 28: The method of clause 27, further comprising providing the value representing the amount of downscaling to be applied to the point cloud geometry data to the residual learning network.

Clause 29: The method of clause 27, further comprising selecting the residual learning network from a plurality of residual learning networks according to the value representing the amount of downscaling to be applied to the point cloud geometry data.

Clause 30: The method of any of clauses 18 and 27-29, wherein the residual learning network includes one or more convolutional neural network layers and a combination unit that combines output of the one or more convolutional neural network layers with the intermediate point cloud data to form the reconstructed point cloud.

Clause 31: The method of any of clauses 18 and 27-30, wherein the residual learning network comprises a first residual learning network, the method further comprising applying a second residual learning network during pre-processing or as a filter to the point cloud.

Clause 32: The method of any of clauses 18 and 27-31, wherein the attribute data includes color data in one of a red-green-blue (RGB) format or a luminance, blue hue chrominance, and red hue chrominance (YCbCr) format.

Clause 33: The method of any of clauses 18 and 27-32, wherein downscaling the point cloud geometry data comprises: for each node of an octree that includes eight leaf sub-nodes where at least one of the eight leaf sub-nodes is occupied by a point, redefining the node as an occupied leaf node in a downscaled octree; and for each node of the octree that includes eight leaf sub-nodes where none of the eight leaf sub-nodes is occupied by a point, redefining the node as an unoccupied leaf node in the downscaled octree.

Clause 34: The method of any of clauses 18 and 27-32, wherein downscaling the point cloud geometry data comprises: for each node of an octree that includes eight leaf sub-nodes where a number of the eight leaf sub-nodes that is occupied is greater than a threshold, redefining the node as an occupied leaf node in a downscaled octree; and for each node of the octree that includes eight leaf sub-nodes where a number of the eight leaf sub-nodes that is occupied is less than or equal to the threshold, redefining the node as an unoccupied leaf node in the downscaled octree.

Clause 35: A computer-readable storage medium having stored thereon instructions that, when executed, cause a processor to: decode encoded point cloud geometry data for a point cloud to form reconstructed point cloud geometry data for the point cloud; downscale the point cloud geometry data to form downscaled point cloud geometry data; decode attribute data for the point cloud using the downscaled point cloud geometry; apply the attribute data to the reconstructed point cloud geometry data to form intermediate point cloud data; and apply a residual learning network to the intermediate point cloud data to form a reconstructed point cloud.

Clause 36: A device for coding point cloud data, the device comprising: means for decoding encoded point cloud geometry data for a point cloud to form reconstructed point cloud geometry data for the point cloud; means for downscaling the point cloud geometry data to form downscaled point cloud geometry data; means for decoding attribute data for the point cloud using the downscaled point cloud geometry; means for applying the attribute data to the reconstructed point cloud geometry data to form intermediate point cloud data; and means for applying a residual learning network to the intermediate point cloud data to form a reconstructed point cloud.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for decoding point cloud data, the device comprising:

a memory configured to store point cloud data; and a processing system comprising one or more processors implemented in circuitry, the processing system being configured to:

decode encoded point cloud geometry data for a point cloud to form reconstructed point cloud geometry data for the point cloud;

downscale the reconstructed point cloud geometry data to form downscaled point cloud geometry data;

decode encoded attribute data for the point cloud using the downscaled point cloud geometry data to form decoded attribute data;

apply the decoded attribute data to the reconstructed point cloud geometry data to form intermediate point cloud data; and apply a residual learning network to the intermediate point cloud data to form a reconstructed point cloud.

2. The device of claim 1, wherein the processing system is further configured to decode a value representing an amount of downscaling to be applied to the point cloud geometry data, wherein to downscale the point cloud geometry data, the one or more processors are configured to downscale the point cloud geometry data according to the value representing the amount of downscaling.

3. The device of claim 2, wherein the one or more processors are configured to provide the value representing the amount of downscaling to be applied to the point cloud geometry data to the residual learning network.

4. The device of claim 2, wherein the one or more processors are configured to select the residual learning network from a plurality of residual learning networks according to the value representing the amount of down-scaling to be applied to the point cloud geometry data.

5. The device of claim 1, wherein the residual learning network includes one or more convolutional neural network layers and a combination unit that combines output of the one or more convolutional neural network layers with the intermediate point cloud data to form the reconstructed point cloud.

6. The device of claim 1, wherein the residual learning network comprises a first residual learning network, and wherein the processing system is further configured to apply a second residual learning network during pre-processing or as a filter to the point cloud.

7. The device of claim 1, wherein the decoded attribute data includes color data in one of a red-green-blue (RGB) format or a luminance, blue hue chrominance, and red hue chrominance (YCbCr) format.

8. The device of claim 1, wherein to downscale the point cloud geometry data, the processing system is configured to:

for each node of an octree that includes eight leaf sub-nodes where at least one of the eight leaf sub-nodes is occupied by a point, redefine the node as an occupied leaf node in a downscaled octree; and for each node of the octree that includes eight leaf sub-nodes where none of the eight leaf sub-nodes is occupied by a point, redefine the node as an unoccupied leaf node in the downscaled octree.

9. The device of claim 1, wherein to downscale the point cloud geometry data, the processing system is configured to:

for each node of an octree that includes eight leaf sub-nodes where a number of the eight leaf sub-nodes that is occupied is greater than a threshold, redefine the node as an occupied leaf node in a downscaled octree; and for each node of the octree that includes eight leaf sub-nodes where a number of the eight leaf sub-nodes that is occupied is less than or equal to the threshold, redefine the node as an unoccupied leaf node in the downscaled octree.

10. The device of claim 1, further comprising a display configured to visually depict the reconstructed point cloud.

11. A method of decoding point cloud data, the method comprising:

decoding encoded point cloud geometry data for a point cloud to form reconstructed point cloud geometry data for the point cloud;

downscaling the reconstructed point cloud geometry data to form downscaled point cloud geometry data;

decoding encoded attribute data for the point cloud using the downscaled point cloud geometry data to form decoded attribute data;

applying the decoded attribute data to the reconstructed point cloud geometry data to form intermediate point cloud data; and applying a residual learning network to the intermediate point cloud data to form a reconstructed point cloud.

12. The method of claim 11, further comprising decoding a value representing an amount of downscaling to be applied to the point cloud geometry data, wherein downscaling the point cloud geometry data includes downscaling the point cloud geometry data according to the value representing the amount of downscaling.

13. The method of claim 12, further comprising providing the value representing the amount of downscaling to be applied to the point cloud geometry data to the residual learning network.

14. The method of claim 12, further comprising selecting the residual learning network from a plurality of residual learning networks according to the value representing the amount of downscaling to be applied to the point cloud geometry data.

15. The method of claim 11, wherein the residual learning network includes one or more convolutional neural network layers and a combination unit that combines output of the one or more convolutional neural network layers with the intermediate point cloud data to form the reconstructed point cloud.

16. The method of claim 11, wherein the residual learning network comprises a first residual learning network, the method further comprising applying a second residual learning network during pre-processing or as a filter to the point cloud.

17. The method of claim 11, wherein the attribute data includes color data in one of a red-green-blue (RGB) format or a luminance, blue hue chrominance, and red hue chrominance (YCbCr) format.

18. The method of claim 11, wherein downscaling the point cloud geometry data comprises:

for each node of an octree that includes eight leaf sub-nodes where at least one of the eight leaf sub-nodes is occupied by a point, redefining the node as an occupied leaf node in a downscaled octree; and for each node of the octree that includes eight leaf sub-nodes where none of the eight leaf sub-nodes is occupied by a point, redefining the node as an unoccupied leaf node in the downscaled octree.

19. The method of claim 11, wherein downscaling the point cloud geometry data comprises:

for each node of an octree that includes eight leaf sub-nodes where a number of the eight leaf sub-nodes that is occupied is greater than a threshold, redefining the node as an occupied leaf node in a downscaled octree; and for each node of the octree that includes eight leaf sub-nodes where a number of the eight leaf sub-nodes that is occupied is less than or equal to the threshold, redefining the node as an unoccupied leaf node in the downscaled octree.

20. The method of claim 11, further comprising:

decoding a value representing an amount of downscaling to be applied to the point cloud geometry data, wherein downscaling the point cloud geometry data comprises downscaling the point cloud geometry data according to the value representing the amount of downscaling; and providing the value representing the amount of downscaling to be applied to the point cloud geometry data to the residual learning network.

* * * * *